US007571352B2

(12) United States Patent
Weichselbaum

(10) Patent No.: US 7,571,352 B2
(45) Date of Patent: Aug. 4, 2009

(54) ASPECT BASED RECOVERY SYSTEM AND METHOD

(75) Inventor: Stefan Weichselbaum, Erlangen (DE)

(73) Assignee: Siemens Aktiengesellschaft (DE)

( * ) Notice: Subject to any disclaimer, the term of this patent is extended or adjusted under 35 U.S.C. 154(b) by 610 days.

(21) Appl. No.: 10/848,406

(22) Filed: May 18, 2004

(65) Prior Publication Data

US 2004/0250156 A1 Dec. 9, 2004

Related U.S. Application Data

(63) Continuation-in-part of application No. 10/440,928, filed on May 19, 2003.

(51) Int. Cl.
*G06F 11/00* (2006.01)

(52) U.S. Cl. .............................. 714/27; 714/21; 714/38

(58) Field of Classification Search .................. 714/21, 714/27

See application file for complete search history.

(56) References Cited

U.S. PATENT DOCUMENTS

| | | | | |
|---|---|---|---|---|
| 561,362 A | | 6/1896 | Tuerk | |
| 4,142,243 A | * | 2/1979 | Bishop et al. | 714/37 |
| 5,159,597 A | * | 10/1992 | Monahan et al. | 714/2 |
| 5,651,362 A | * | 7/1997 | Shigyo et al. | 600/425 |
| 5,790,117 A | * | 8/1998 | Halviatti et al. | 715/744 |
| 5,889,940 A | | 3/1999 | Liddell et al. | |
| 5,905,856 A | * | 5/1999 | Ottensooser | 714/38 |
| 6,003,140 A | | 12/1999 | Pientka et al. | |
| 6,065,017 A | | 5/2000 | Barker | |
| 6,122,752 A | * | 9/2000 | Farah | 714/2 |
| 6,170,068 B1 | | 1/2001 | Liddell et al. | |
| 6,173,416 B1 | | 1/2001 | Liddell et al. | |
| 6,243,830 B1 | | 6/2001 | Nakatsugawa | |
| 6,243,840 B1 | | 6/2001 | Raad et al. | |
| 6,311,290 B1 | | 10/2001 | Hasbun et al. | |
| 6,363,494 B1 | * | 3/2002 | Farah | 714/2 |
| 6,684,277 B2 | * | 1/2004 | LaFauci et al. | 710/100 |
| 6,687,846 B1 | * | 2/2004 | Adrangi et al. | 714/4 |
| 6,721,764 B2 | | 4/2004 | Hitz et al. | |
| 6,789,214 B1 | | 9/2004 | De Bonis-Hamelin et al. | |
| 6,802,025 B1 | | 10/2004 | Thomas et al. | |
| 6,820,214 B1 | | 11/2004 | Cabrera et al. | |
| 6,895,529 B2 | | 5/2005 | Egolf et al. | |
| 6,941,487 B1 | | 9/2005 | Balakrishnan et al. | |

(Continued)

FOREIGN PATENT DOCUMENTS

DE 196 01 804 A1 7/1997

OTHER PUBLICATIONS

Apr. 13, 2007 Non-Final Office Action, U.S. Appl. No. 10/440,928.

(Continued)

*Primary Examiner*—Emerson C Puente
(74) *Attorney, Agent, or Firm*—Brinks Hofer Gilson & Lione

(57) ABSTRACT

An aspect based recovery system and method is provided. The state of a device may be defined by one or more aspects of the device. Aspects may include graphical user interface, database, security, user configuration, site configuration, and current user. Using this aspect-based definition, the current state of the device may be monitored. For example, the current state of the system may be determined by examining the aspects which define the state. Moreover, using this aspect-based definition, the current state of the device may be modified. Aspects may be changed so that the state of the system may be changed to a predetermined state.

39 Claims, 17 Drawing Sheets

U.S. PATENT DOCUMENTS

| | | | | |
|---|---|---|---|---|
| 7,006,117 | B1 * | 2/2006 | Man et al. | 345/501 |
| 7,191,364 | B2 * | 3/2007 | Hudson et al. | 714/38 |

OTHER PUBLICATIONS

Response to Apr. 13, 2007 Non-Final Office Action, U.S. Appl. No. 10/440,928, filed in the PTO on Jul. 11, 2007.

German Office Action with English Translation.

May 1, 2007 Non-Final Office Action, U.S. Appl. No. 10/848,406.

Peter Aiken/Bart Arenson/Jerome Colburn, Microsoft Computer Dictionary, Microsoft Press, Fifth Edition, 4 pages.

* cited by examiner

| State Group | Aspects | Description | System Default | Possible State after Test | Micro Cleanup | Coarse Cleanup |
|---|---|---|---|---|---|---|
| Database | Default Data | A number of patients and images that are centrally administrated and that are considered standard for all test purposes | This data is loaded into the database | Patient deleted | Reload patient to database | Purge and reload standard database |
| | | | | Protection changed | Reestablish old protection | |
| | | | | Patient modified | delete and reload patient to database | |
| | Testcase specific data | Certain data with specific properties necessary for a given test | Data does not exist in any of the databases | Data exists in database in addition to standard data | Remove non-standard data | |
| | Exchangeboard | Long runners on the exchangeboard | No active long runners pending execution or completion | A long running job was initiated during testing | wait for completion | Forced cleanup of the exchangeboard |
| GUI | Active Taskcard | The taskcard that is visible on-screen | Viewer Taskcard | Other taskcard selected | Bring Viewer taskcard to front via rti (run time interface) | Bring Viewer taskcard to front via rti |
| | Dialog Windows | syngo® dialog windows like Patient Registration, CorRea, Change Camera, Fusion Definition, etc. | No dialog windows are open. | Dialog window is open. | Close any dialog windows opened during test. | Forced component restart. |
| | Message Boxes | Error message boxes due to faults during background processing, erroneous user input, etc. | None visible. | Message Boxes related to the test appear and cause test to hang up. | Close all dialog windows that might have opened during the test. | |
| | | | | Message box related to background processing of a different test or unrelated to test appears. | Check existence of and close all dialog windows. | |

FIG. 8a

| State Group | Aspects | Description | System Default | Possible State after Test | Micro Cleanup | Coarse Cleanup |
|---|---|---|---|---|---|---|
| | Message Box suppresion state | During a running acquisition, message boxes are suppressed. | off | Acquisition running is emulated and thus message boxes are suppressed. | Send Application event indicating that acquisition has stopped. Close any message boxes that might eventually appear. | |
| | Loaded datasets | One or more datasets are loaded into one or more taskcard applications | No datasets are loaded. | Some datasets are left. | Send Close Patient Commands to all applications. Answer all requests to confirm saving with no. | |
| | Language | Language configuration | Version default after installation | Language changed for a certain user account | Reconfigure version default language | Purge and reestablish complete default configuration. |
| DICOM | Association | DICOM (Digital Imaging and Communication) Association Open. DICOM is a structure for networking in the medical imaging context | No Associations Opened | Association pending | Close Association | Forced component restart. |
| Networking | Satellite Console | Existence of configured satellite consoles | No satellite consoles exist; PC works in a standalone manner. | Satellite consoles were necessary to conduct the test and remain configured. | Close connection to Satellite Console(s) and delete corresponding Configuration data | Close connection to Satellite Console(s) and delete corresponding Configuration data |
| Logs | Security | Audit Trail | Audit Trail is empty | Audit trail exists | Delete Audit Trail | Delete Audit Trail |

FIG. 8b

| State Group | Aspects | Description | System Default | Possible State after Test | Micro Cleanup | Coarse Cleanup |
|---|---|---|---|---|---|---|
| Security | Logged in user | The user that is logged in and active | administrator | other user logged in | logout other user, login administrator | logout all users, login administrator |
| | | | | users logged in in background (switch user command) | logout other users | |
| | Users on machine | The user accounts that persist on the testmachine (*i.e.*, users that may access testmachine) | The testmachine knows all standard users and all users from the test hospital | Additional users exist | Remove additional user accounts | Remove additional user accounts, groups and reinstall testhospital |
| | User groups | The security relevant user groups (*e.g.*, privileges assigned to user groups) | User groups from the test hospital are assigned. | Additional user groups exist | Remove additional user groups | |
| | User to group assignment | additional group membership for one or more users (*e.g.*, tailoring privileges assigned for specific user for a specific test) | User group memberships from the test hospital are assigned. | Additional group membership exists | Remove additional group memberships | |
| | Site Specific Configuration | Security Activation Settings | User Management, Data Access Check, Functional Check, and Trusted Host DICOM Access are enabled, Auditing is disabled. | Settings changed | Change registry settings to default | Purge and reestablish complete default configuration. |
| Viewer | User Specific Configuration | User specific settings | Default after installation | Settings changed | Change registry settings to default | Purge and reestablish complete default configuration. |
| | Active Applications | Active Viewer applications | Default after startup | Other tools selected | Change enabled Viewer applications to default. | Forced component restart |

FIG. 8c

| State Group | Aspects | Description | System Default | Possible State after Test | Micro Cleanup | Coarse Cleanup |
|---|---|---|---|---|---|---|
| | Active Minitaskcard | The minitaskcards that are active in the main application taskcard | Default after system startup | Other taskcard selected | Click to select correct minitaskcards | |
| Filming | User Specific Configuration | User specific settings | Default after installation | Settings changed | Change registry settings to default | Purge and reestablish complete default configuration. |
| | Site Specific Configuration | Available layouts | Only predefined layouts available | New layouts defined | Delete new layouts | |
| | | | | Old layouts modified | Delete old layouts and replace by their respective defaults. | |
| | Available cameras and paper formats | The cameras and layouts that are configured into the system | 1 Camera Simulator named DSS is defined with default media formats | Additional formats defined | Purge camera/media format table and reinstall DSS. | Purge camera/media format table and reinstall DSS. |
| | Active Applications | Active Filming applications | Default after startup | Other tools selected | Change enabled Filming applications to default. | Forced component restart |
| | Active Minitaskcard | The minitaskcards that are active in the main application taskcard | Default after system startup | Other taskcard selected | Click to select correct minitaskcards | |
| 3D | User Specific Configuration | User specific settings | Default after installation | Settings changed | Change registry settings to default | Purge and reestablish complete default configuration. |
| | Active Applications | Active 3D applications | Default after startup | Other tools selected | Change enabled 3D applications to default. | Forced component restart |
| | Active Minitaskcard | The minitaskcards that are active in the main application taskcard | Default after system startup | Other taskcard selected | Click to select correct minitaskcards | |

FIG. 8d

| State Group | Aspects | Description | System Default | Possible State after Test | Micro Cleanup | Coarse Cleanup |
|---|---|---|---|---|---|---|
| Patient Browser | User Specific Configuration | User specific settings | Default after installation | Settings changed | Change registry settings to default | Purge and reestablish complete default configuration. |
| Patient Registration | User Specific Configuration | User specific settings | Default after installation | Settings changed | Change registry settings to default | Purge and reestablish complete default configuration. |
| | Site Specific Configuration | Configured UI Items | | | | |
| CorRea | User Specific Configuration | User specific settings | Default after installation | Settings changed | Change registry settings to default | Purge and reestablish complete default configuration. |
| | Site Specific Configuration | Configured UI Items | | | | |
| MPPS | User Specific Configuration | User specific settings (e.g., for a hospital worker, technician) One of the user specific setting may be the language used | Default after installation | Settings changed | Change registry settings to default | Purge and reestablish complete default configuration. |
| | Site Specific Configuration | For a given workstation, the configuration parameters, such as User Interface items | | | | |

FIG. 8e

ASPECT BASED RECOVERY SYSTEM AND METHOD

REFERENCE TO RELATED APPLICATIONS

This application is a continuation-in-part of U.S. application Ser. No. 10/440,928, filed May 19, 2003, which is hereby incorporated by reference herein in its entirety.

BACKGROUND

Automation of testing holds great promise for testing products in an efficient and reliable manner. Ideally, test routines would automatically execute in an arbitrary sequence without the need for human supervision. However, the reality of test automation has fallen far short of its promise.

Automated testing may seek to test a variety of testing protocols, such as protocols randomly selected or a variety of protocols. However, automated testing is typically limited in the testing protocols selected. For example, the selection of protocols for testing may be limited to those protocols which have a common starting point. Otherwise, if protocols are selected without a common starting point, manual intervention and/or rebooting of the system may be required to run the testing.

Moreover, automated testing searches for exceptional occurrences in the system, such as failures in the system. When previous automated testing schemes encountered an exceptional circumstance, they were unable to address it in an effective manner. Previous automated systems might simply halt, requiring manual intervention by an operator. The manual intervention may include a rebooting of the system. If rebooting is unsuccessful, the operator might then reinstall the software to fix the problem. This dependence on operator intervention is costly from both a time and a human perspective. The testing software may sit idly for a considerable amount of time before an operator may intervene to fix the problem. Further, the time required to reinstall the software may be considerable. Other automated systems have attempted to compensate for an exceptional occurrence by causing, in effect, a restart or a reboot of the testing system. All of the routines necessary to execute the testing system are reloaded, thereby reinitializing the system. The reloading of the system software may enable the test automation to recover after a fatal error. However, this solution is again inadequate since rebooting is a brute force method which affects all of the system, including those portions of the system which are operating correctly. The time involved in reloading the system software can be significant, especially with systems that have large files that must be reloaded into RAM. Further, rebooting the system may destroy valuable information for diagnosing the exceptional occurrence.

What is needed is a better method and system for automated testing.

SUMMARY

A computer system may be in a variety of states during the its operational life (such as during automated testing, use in the field, etc.). The states of the computer system may be defined by one or more aspects of the computer system. The aspects which define the state may be independent of one another and may provide a measure of the current state of the system. Examples of aspects may include graphical user interface, database, security, user configuration, site configuration, and current user.

Using aspects to define the computer system facilitates verifying and/or modifying of the operation of the computer system. A first aspect of the invention is verifying the state of the computer system using a plurality of aspects. The state of the computer system may be verified after a software routine is executed. Execution of the software routine may bring expected results, such as a change in the state of the computer system to an expected state with expected aspects. These expected aspects may be compared with the actual aspects of the computer system after executing the software routine to verify whether or not the actual state of the computer system is the expected state. There are many different types of software routines which may be executed, including an automated test routine, such as a precondition test routine, a testscript, and a postcondition test routine. Monitoring of the computer system may facilitate automated testing since one may determine whether the computer is in a known or an unknown state.

One embodiment of the first aspect of the invention is a system for verifying the state of the computer system. The system may comprise logic for defining the state of the computer system by a plurality of aspects of the computer system, logic for accessing a software routine for placing the computer system in an expected state defined by a plurality of expected aspects, logic for executing the software routine on the computer system after which the computer system is in a current state defined by a plurality of current aspects, and logic for verifying whether the current state of the computer system is the expected state based on comparison of at least one of the plurality of current aspects with at least one of the plurality of expected aspects.

Another embodiment of the first aspect of the invention is a method for verifying the state of the computer system. The method may comprise defining the state of the computer system by a plurality of aspects of the computer system, accessing a software routine for placing the computer system in an expected state defined by a plurality of expected aspects, executing the software routine on the computer system after which the computer system is in a current state defined by a plurality of current aspects, and verifying whether the current state of the computer system is the expected state based on comparison of at least one of the plurality of current aspects with at least one of the plurality of expected aspects.

A second aspect of the invention is modifying the state of the computer system by changing an aspect or aspects which define the state of the computer system. Changing the state of the system facilitates automated testing of the computer system. For example, during automated testing, the computer system may enter an unknown state. In the event the system is in an unknown state, the aspects may be changed to a known state, such as the system default state. As another example, in the course of automated testing, different tests may be executed which start from different states. In such testing sequences, the state may be changed after running the first testing sequence so that the second testing sequence, with a starting state different from the first testing sequence, may be executed. Further, the modification of the aspects may be independent of one another and may be iteratively performed.

One embodiment of the second aspect is a system for modifying the state of the computer system. The system may comprise logic for defining the state of the computer system by a plurality of aspects of the computer system, logic for executing a software routine on the computer system after which the computer system is in a current state defined by a plurality of current aspects, logic for determining whether to execute an automatic recovery routine based on the current state of the system, and logic for executing the automatic recovery routine, the automatic recovery routine modifying at least one aspect to place the computer system in a recovery state.

Another embodiment of the second aspect is a method for modifying the state of the computer system. The method may comprise defining the state of the computer system by a plurality of aspects of the computer system, executing a software routine on the computer system after which the computer system is in a current state defined by a plurality of current aspects, determining whether to execute an automatic recovery routine based on the current state of the system, and executing the automatic recovery routine, the automatic recovery routine modifying at least one aspect to place the computer system in a recovery state.

BRIEF DESCRIPTION OF THE DRAWINGS

FIGS. 8*a-e* are a table of aspect based recovery for a medical imaging application.

DETAILED DESCRIPTION OF THE INVENTION

Figure 1:
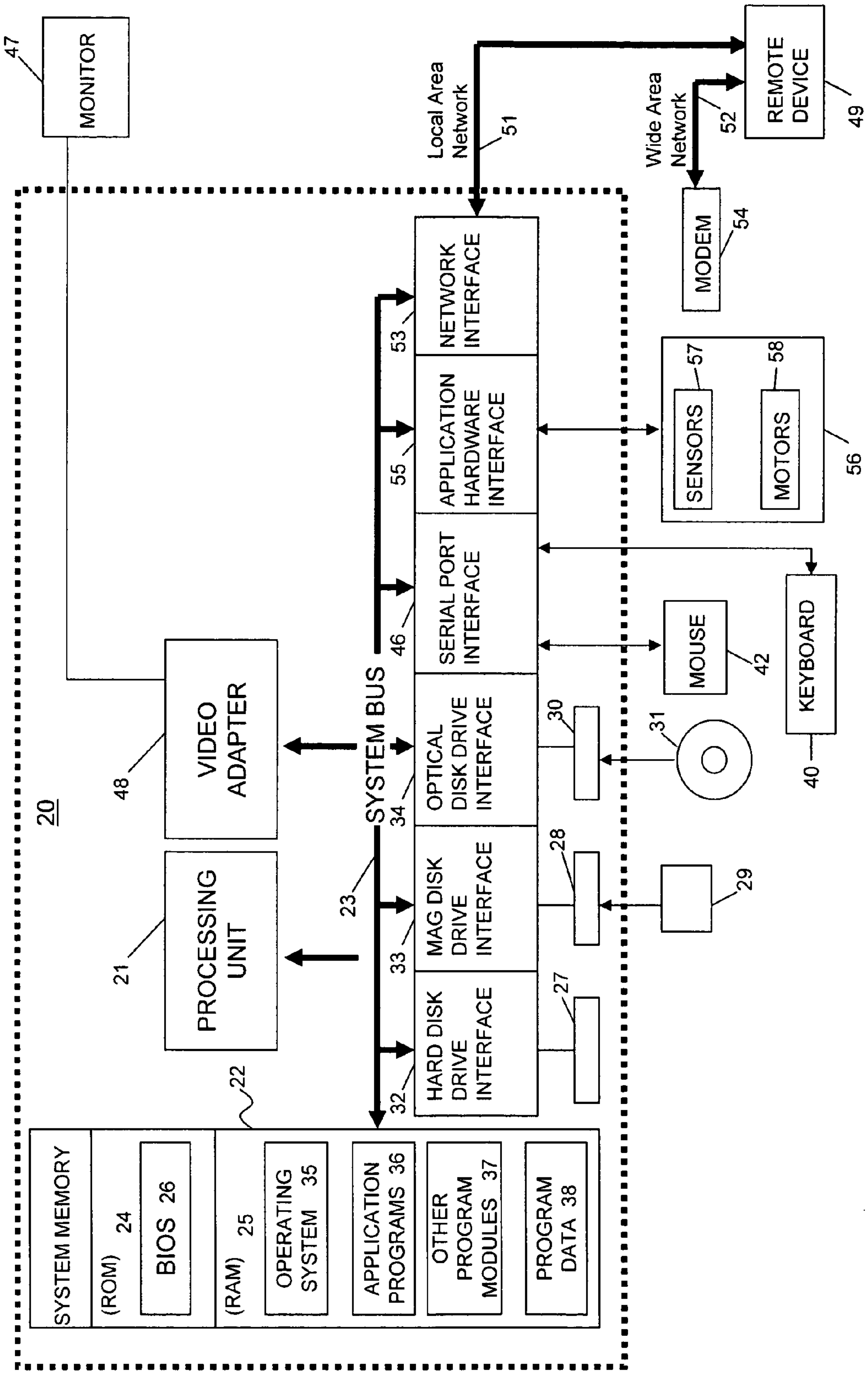
FIG. 1 is a block diagram of a computer system that may be used to implement a method and apparatus for aspect based recovery according to one aspect of invention.

A computer system may be a software-based product, a software/hardware product, or hardware-based product. During its operational life, the computer system may be in many states of operation. Some states of operation may be known or expected states and other states of operation may be unknown or unexpected states. The ability to monitor and/or change the state of operation of the computer system allows for better control of the computer system. One manner of monitoring and/or changing the operation of the computer system is by defining the state of the computer system based on one or more aspects. As discussed in more detail below, the state may be monitored by analyzing the aspects which define the state, such as by comparing the aspects with known aspects. Moreover, the state may be modified by changing the aspects to known aspects, thereby changing the state of the computer system.

The aspect-based definition of the computer system enables better control of the computer system in any phase of the operation life of the computer system. One phase of the product is the operation of the product in the field. Another phase, as discussed in the background section, involves testing of products or applications. One type of testing is automated testing.

Automated testing is typically performed prior to release of the product into the field. Products may be subject to a variety of tests, such as regression testing, integration testing, or validation testing, with little or no human intervention. For example, regression testing is paramount to quality assurance of changes to an established product, such as new versions. In addition to testing the intended effects of the changes, regression testing verifies that the changes did not produce unintended effects such as altering behavior of established functionality. For example, a change in one routine for the software code of a product may have both intended and unintended consequences for the overall product resulting in the product entering an unknown state. Automated testing allows investigation into these consequences. The products tested by the testing automation protocols may include products entirely composed of software, software/hardware products and products entirely composed of hardware. Testing programs may be designed to test a product or application.

Testing typically involves simulating various sequences of operation using a series of tests, which may be selected in a variety of manners, such as randomly or systematically. As discussed in the background section, there may be difficulty in running a series of tests if the tests do not begin in the same default state. A first test may begin in a first elevated state and a second test may begin in a second elevated state. In a state model for a computer system, an elevated state may comprise a starting state for the execution of a software routine, such as a test script. The elevated state may be a state which is different from the system default state of the system. Attempting to automatically test the first and second test may be difficult due to different starting points or elevated states of the tests. Using the aspect based recovery mechanism, as discussed below, may enable automatic testing of a variety of test protocols in a more efficient and simpler manner.

Moreover, the state of the system may be changed from an unknown state to a known state using the aspect based recovery mechanism enabling efficient testing. Through automated testing using the series of tests, the application under test may be evaluated. When testing, the application under test may enter an unknown state or encountering an exceptional circumstance, such as a crashing or hanging of the system. These exceptional circumstances may be due to an error in the testing program or due to a flaw in the application under test. For example, the testing program may be causing the error that lead to entrance into the unknown state. Alternatively, a change in the software may have resulted in an unintended consequence that leads to entrance into the unknown state. Regardless, the exceptional circumstance may be analyzed to determine its cause. And, the aspect based recovery mechanism can bring the system to a known state more quickly than rebooting the system.

Turning to the drawings, wherein like reference numerals refer to like elements, FIG. 1 shows a block diagram of a computer that may be used to implement a method and apparatus for aspect based recovery according to one aspect of invention. FIG. 1 and the following discussion are intended to provide a brief, general, description of a suitable computing environment in which the embodiments may be implemented. In one application, aspect based recovery is applied to automation of testing of products. The computer may be used to test a variety of products including a software product, which may be loaded into the system memory 22 of the computer, a hardware product, or a software/hardware product. The hardware product may be resident in hardware 56 and communicate via application hardware interface 55. Alternatively, the hardware or hardware/software product may be resident in remote device 49 and communicate with computer 20 via local area network 51 or wide area network 52.

Although not required, the embodiments are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the embodiments may be practiced with other computer system configurations, including hand-held devices, multiprocessor systems, microprocessor-based or programmable consumer electronics, network PCs, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the one embodiment includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 may include read only memory (ROM) 24 and random access memory (RAM) 25. A basic input/output system 26 (BIOS) containing the basic routines that helps to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. A software application under test may be loaded into the system memory 22 via either the hard disk drive 27, magnetic disk drive 28, or the optical disk drive 30. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. The application programs 36 may include the software for the application under test. Further, the other program modules 37 may include the software for the test scripts, used to execute the test automation. Moreover, the program data 38 may include data necessary for the test scripts to execute the test automation, such as data for simulating operation of the application under test.

A user may enter commands and information into the computer 20 through input devices such as a keyboard 40 and mouse 42. For example, the user may use the keyboard 40 in order execute the test scripts software to test the application under test. Other input devices (not shown) may include a microphone, joystick, game pad, satellite dish, scanner, or the like. These and other input devices are often connected to the processing unit 21 through a serial port interface 46 that is coupled to the system bus 23, but may be collected by other interfaces, such as a parallel port, game port or a universal serial bus (USB). A monitor 47 or other type of display device may also be connected to the system bus 23 via an interface, such as a video adapter 48. In addition to the monitor 47, computers typically include other peripheral output devices (not shown), such as speakers and printers.

The computer 20 may further include an application hardware interface 55. The application hardware interface 55 enables interfacing to hardware 56 with the application under test, on a hardware level. As discussed above, the application under test may include a hardware aspect. The application hardware interface provides the inputs and outputs necessary for simulation during testing. For example, the hardware 56 for the application under test may include sensors or require sensory input. In this instance, the application hardware interface 55 may provide that input, and receive any output via sensors 57 in order to simulate the actual environment of the application under test. In addition, the hardware 56 for the application under test may include motors 58. The inputs and outputs for the motors may be transmitted to the computer via the application hardware interface 55. In one embodiment, the hardware 56 are devices for x-ray, computed tomography, magnetic resonance, ultrasound or other imaging systems.

The computer 20 may operate in a networked environment using logical connections to one or more remote devices, such as a remote device 49. The remote device 49 may be another computer, a server, a router, a network PC, a peer device or other common network node, and typically includes many or all of the elements described above relative to the computer 20. The logical connections depicted in FIG. 1 include a local area network (LAN) 51 and a wide area network (WAN) 52. In addition, remote device 49 may comprise a device which combines hardware and/or software functionality. The remote device may comprise a variety of devices, such as medical devices including: computed radiography machine; computed tomography (CT) machine; digital X-Ray machine; mammography machine; magnetic resonance machine; nuclear medicine machine; positron emission tomography (PET) machine; radiation therapy (RT) machine; ultrasound machine; X-ray angiography machine; X-ray radiofluoroscopy (XRF) machine; urology machine; surgery machine; and intensive care units (such as bedside monitoring). The computer 20 may thus interact with remote devices. As one example, the application may be executed on computer 20 and interact with a remote scanning device. The application may thus receive data from the remote scanning device and may also control the scanning device (such as by initiating or halting scans of a patient). Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
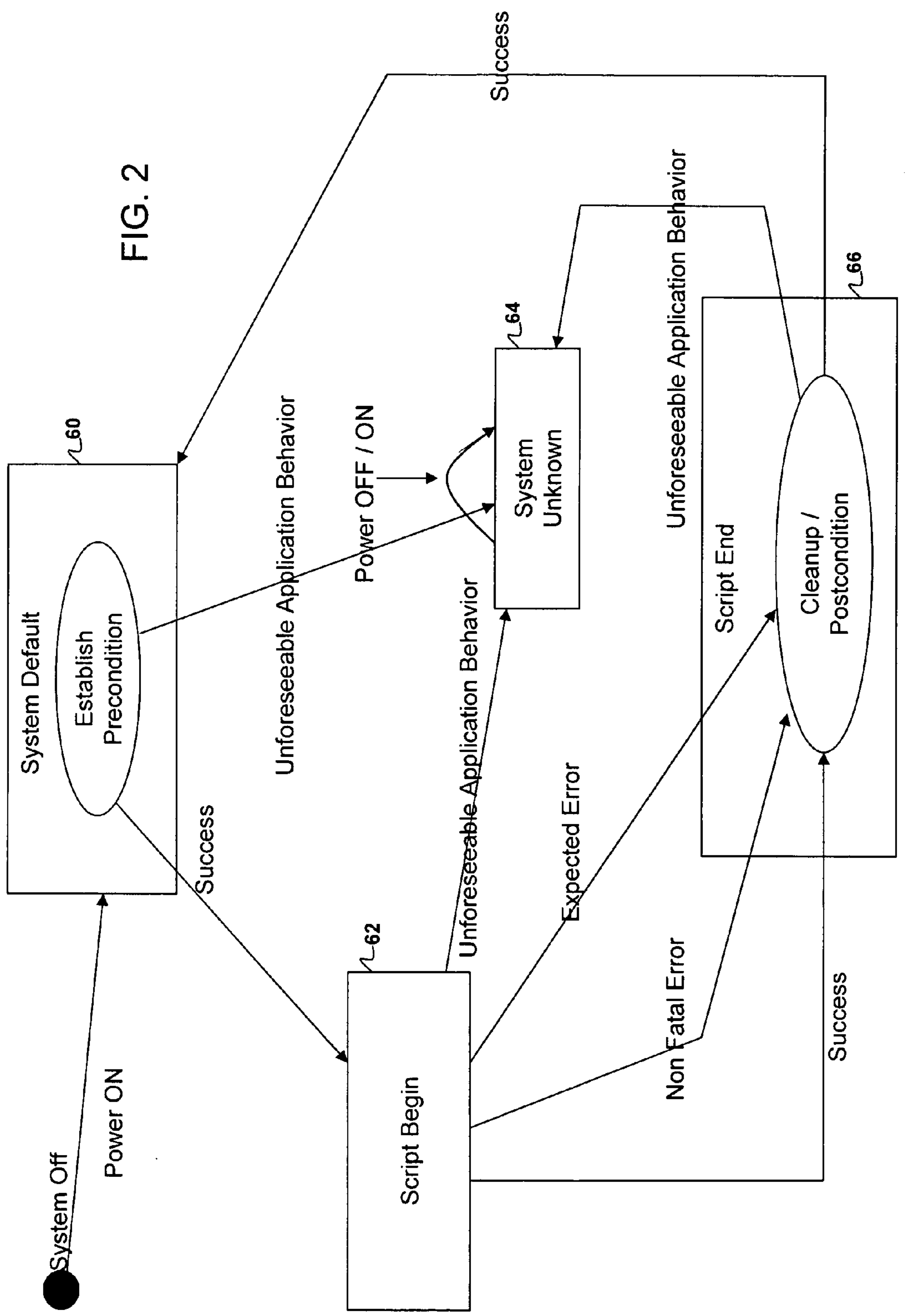
FIG. 2 is a flow diagram of one embodiment of potential states when testing an application.

In order to execute the testing software better, the states of the automation software are analyzed. FIG. 2 shows a flow diagram of potential states when testing an application. These states are described merely for illustrative purposes and are not exhaustive of the states in a software automation system. Further, the states are described in a specific test automation context wherein a typical testing sequence proceeds through three different stages: precondition, test script and postcondition. Again, these stages of testing are merely for illustrative purposes. Fewer, more, or different stages of testing may be used.

The precondition stage describes the condition(s) that should be met before a specific test is run. As merely one example, if the specific test is analyzing a magnetic resonance (MR) image for a patient, the precondition may be to load the magnetic resonance image for the patient into a memory location accessible by the testing automation software. The test script stage is the execution of the test. In the magnetic resonance example, the test script stage is the analysis of the specific MR image previously loaded in the precondition stage. Finally, the postcondition stage describes the condition(s) that should be performed prior to executing another testing sequence. In effect, the postcondition stage is a "cleanup" stage for cleaning up the system prior to executing the next test. In the magnetic resonance example, the postcondition stage may overwrite the memory location previously written by the precondition stage. The postcondition stage may be unnecessary if, after running the test script, the system may run another test (be in system default, as described below).

Table I describes the state transitions present in FIG. 2.

TABLE 1

State Transitions

| Transition | | | |
|---|---|---|---|
| From | To | Via | Note |
| System Off | System Default (Block 60) | Power ON | Initializing of the system; loading of the system software into RAM |
| System Default (Block 60) | Script Begin (Block 62) | Precondition Success | Expected conditions for establishing test script successfully established |
| System Default (Block 60) | System Unknown (Block 64) | Unforeseeable Application Behavior | Expected conditions for establishing test script fail |

TABLE 1-continued

State Transitions

| Transition | | | |
|---|---|---|---|
| From | To | Via | Note |
| Script Begin (Block 62) | Script End (Block 66) | Test Script Success | Test script has been successfully executed |
| Script Begin (Block 62) | Script End (Block 66) | Expected Error | Target state may differ slightly from test success transition, but difference in states may be undetectable. The expected error may include a known error in a software routine. For example, a particular version of software may have a known error. |
| Script Begin (Block 62) | Script End (Block 66) | Non-Fatal Error | Test script has not completed successfully, but has not crashed or caused a hangup in the system. The target state may differ from test success transition. Causes of a non-fatal error may include error in the test script or error in the application under test |
| Script Begin (Block 62) | System Unknown (Block 64) | Unforeseeable Application Behavior | This usually occurs when the application under test crashes or hangs up. Some examples of crashing may include an unexpected dialog (in user interface testing), a missed timeout, etc. |
| Script End (Block 66) | System Default (Block 60) | Post condition Success | Postconditions successfully executed. Specifically, the condition(s) prior to executing another testing sequence successfully performed. |
| Script End (Block 66) | System Unknown (Block 64) | Unforeseeable Application Behavior | Postconditions not successfully executed. Condition(s) prior to executing next testing sequence not successfully performed. Possible causes may include:<br>Bad testcase design. The test script may have an error in the code.<br>Non-Fatal Error cause. Although the test scrip did not hang up after the non-fatal error, the postcondition cleanup cannot compensate for the non-fatal error.<br>Expected error cause. The expected error transition has lead to Script End; however, the postcondition cleanup is not flexible enough to accommodate that cleanup of the effects of the expected error as well. |

As shown in FIG. 2, the state of the system includes a system unknown state. The system unknown state may include a state that cannot be reached after reboot. For simplicity of illustration, FIG. 2 shows only one system unknown state which may be entered via unforeseeable application behavior in a variety of ways. The states in the system may comprise more than one unknown state. For example, each unforeseeable application behavior may lead to a different unknown state. In addition, for simplicity of illustration, only one precondition-test script-postcondition sequence is shown. Additional sequences may be analyzed.

The states of testing automation may be described in a variety of ways. One way is to describe a specific state of the testing automation as being composed of a number of aspects. An aspect is a substate that can be individually described as a function. For example, a tangible aspect may be the database content $A_{db}$. Other examples of aspects may include current user (e.g., current user logged in), current user rights (e.g., security access of the current user), user interface (UI) aspect (e.g., message boxes open, dialog windows), user configuration (e.g., settings for a specific user or set of users), site configuration (e.g., configuration for a specific workstation), etc. Other aspects may be included to describe the state of the system. The example described below details some examples of these aspects. Summed up, all aspects yield the State equation:

$$M=A_{db}+A_{UserConfig}+A_{SiteConfig}+A_{CurrentUser}+A_{UserPrivileges}+\ldots$$

The state, M, is described as a sum of independent aspect state functions as shown in the following:

$$M=M(db,\ \mathrm{UserConfig},\ \mathrm{SiteConfig},\ \mathrm{CurrentUser},\ \mathrm{UserPrivileges},\ldots)$$

In one embodiment, the aspects may be described as functions. A concrete value of this function may be defined. For example, in the database aspect (db), a concrete value for this function may be that a specific patient (Patient Xyz) is not present in the database $A_{db}^{XyzNotFound}$. Hence, the aspect for the database may be defined by a variety of functions, such as:

$$A_{db}=\Sigma_{Patients}(A_{db}^{i})$$

with A being defined by the precise makeup of the Patient's data entries. As such, the definition and refinement of the aspect functions may be performed in a myriad of ways.

The aspects which define the state equation may be orthogonal to one another. Changes in the aspects lead to a change in the state, with the state of the system being altered by altering the aspects individually and independently of one another. Moreover, a change in an aspect may be performed discretely. Specifically, a change may be made to one aspect with other aspects which define the state being unaffected. This is in contrast to a forced restart of the system whose changes are interdependent and result in changing parts of the system that are operating correctly along with other parts of the system that require modification. Thus, these individual, discrete, and independent alterations of aspects lead to orthogonal transitions of the system state. While the aspects are defined as independent of each other, normal operation of the testing software is likely to restrict possible aspect changes to the current value of other aspect functions. A medical imaging application, for example, may include aspects which, in practice, are interrelated. For example, the user privileges aspect may not depend on database aspect (e.g., database content). However, normal operation of the medical imaging application software restricts the values of some of the aspects, including the database content which depends on the user privileges. Therefore, aspects in practice may be connected, limiting some of the changes to the aspects. These changes are discussed in further detail below.

As discussed above, an aspect may be alterable individually, discretely, and/or independently of other aspects. The design of the application under test may facilitate individual and independent alterability of the aspects. The application under test may be designed as a series of components, with interfaces for each of the components. Aspects may be assigned to the components allowing the independent and individual change of each of the components via the interfaces. An example of this may be for a medical imaging application which includes a database and a database scripting interface which allows individual and independent changes to the database separate from other components in the system. In this manner, the change in the database aspect amounts to an orthogonal transition of the system state.

As shown above, the state equation, M, is defined with trailing spaces. The trailing spaces indicate that there may be further aspects not formulated or not known. These further aspects are unconsidered aspects. However, proper definition of aspects may still allow robust aspect based recovery if aspects are changes in aspects are independent or orthogonal to one another. As merely one example, consider the following aspects: security, logged in user, database inventory. The security and logged in user aspects are defined from a system point of view and may be accessible via command line interfaces. The database inventory aspect is defined as what is visible to the current user in the Patient Browser subapplication (user point of view). In the instance where a dataset is protected, it is not visible to the current user. If the protection for the dataset is removed through a command line interface, the transition is orthogonal for logged in user aspect and security aspect. Appendix A lists a tool, which may be written in VBScript or Jscript, for determining the state and recovering the state of the security aspect. However, in the Patient Browser subapplication, that previously hidden dataset will become visible, so that, for the database inventory aspect, there is a dependency and nonorthogonal transition.

One aspect of this embodiment is determining the state of the application under test and, if the application under test is not in an expected state, automatically changing the state of the application under test to the expected state or to another state. This determination of the state of the system may be performed for any state of the system. Further, the determination of the states may depend on the testing routine or may be independent of the testing routine. For example, the check for the system default state, which is entered after start-up of the system, may be independent of the testing routine chosen. Each of the aspects for the system default state may comprise a generic check to determine whether the particular aspect is in the system default state. For example, an aspect object has a fixed part that is set during its construction, which may include the aspect's name, associated system default, and associated recovery. These states which do not depend on the testing routine may be termed as generic to operation of the system. The generic states allow for comparison of the values of the aspects of the system with values of the aspects for the generic states. Other non-generic states may require checks which are specific to the testing routine. These non-generic or dynamic states support a dynamic part for the aspect object that varies according to the test (precondition, precondition verification, and postcondition). The current state of the application under test may be determined by examining the aspects, such as by comparison of the aspects of the current state with aspects of a known state, such as system default. If it is determined, based on the comparison, that the current state is not in the expected state, the system is in an unknown or undesired state. In that instance, the aspects associated with the state may be changed in order to change the state of the system. The aspect based recovery may be implemented at any state of operation of the system, such as from system default, to elevated states, to precondition, to postcondition, as discussed in more detail below. Typically, each aspect may have a recovery to a known state, such as the system default state. In one embodiment, the aspect based recovery consists of modifying aspects of the state of the system to aspects of a known state (such as the system default state). Additional cleansing of the system may optionally be implemented.

The changing of the state allows for a fast and efficient recovery system. Otherwise, the system under test may remain in the unexpected or unknown state, thereby wasting testing time, or potentially requiring a restart, reboot or reinstallation to continue the testing of the system. For example, the present invention differs from rebooting, which is a brute force method of recovery, as discussed in the background section. Rebooting may change the entire system with no control over which portions of the system may be modified. By contrast, the aspect based recovery may select which aspects may be recovered or modified. By analogy, rebooting and aspect based recovery may be likened to cleaning a blackboard. The blackboard may have writing on it in various places. Rebooting washes clean all of the writing on the blackboard, and then rewrites on sections of the blackboard as part of the rebooting initialization process. By contrast, aspect based recovery may first record the writing on the blackboard (to provide the state of the system for later analysis), may selectively and discretely clean certain parts of the blackboard without wiping the entire blackboard clean, and may rewrite the parts cleaned. In this manner, aspect based recovery may tailor the recovery of the system from an unknown state to a known state without correcting parts of the system that do not need correcting and without unnecessarily wasting time or resources.

An example of the savings in using aspect based recovery is that automated aspect based recovery may require 1 minute per aspect whereas manual recovery may take as much as 10 times as long. Estimating that 30% of all test scripts must be recovered in some way leads to an enormous time savings in using the automated recovery.

Another embodiment is providing information regarding the system under test if the system is not in an expected state. The information provided may include data regarding one, some, or all of the aspects for the unexpected state and may include data regarding one, some, or all of the aspects for the expected state.

Figure 3:
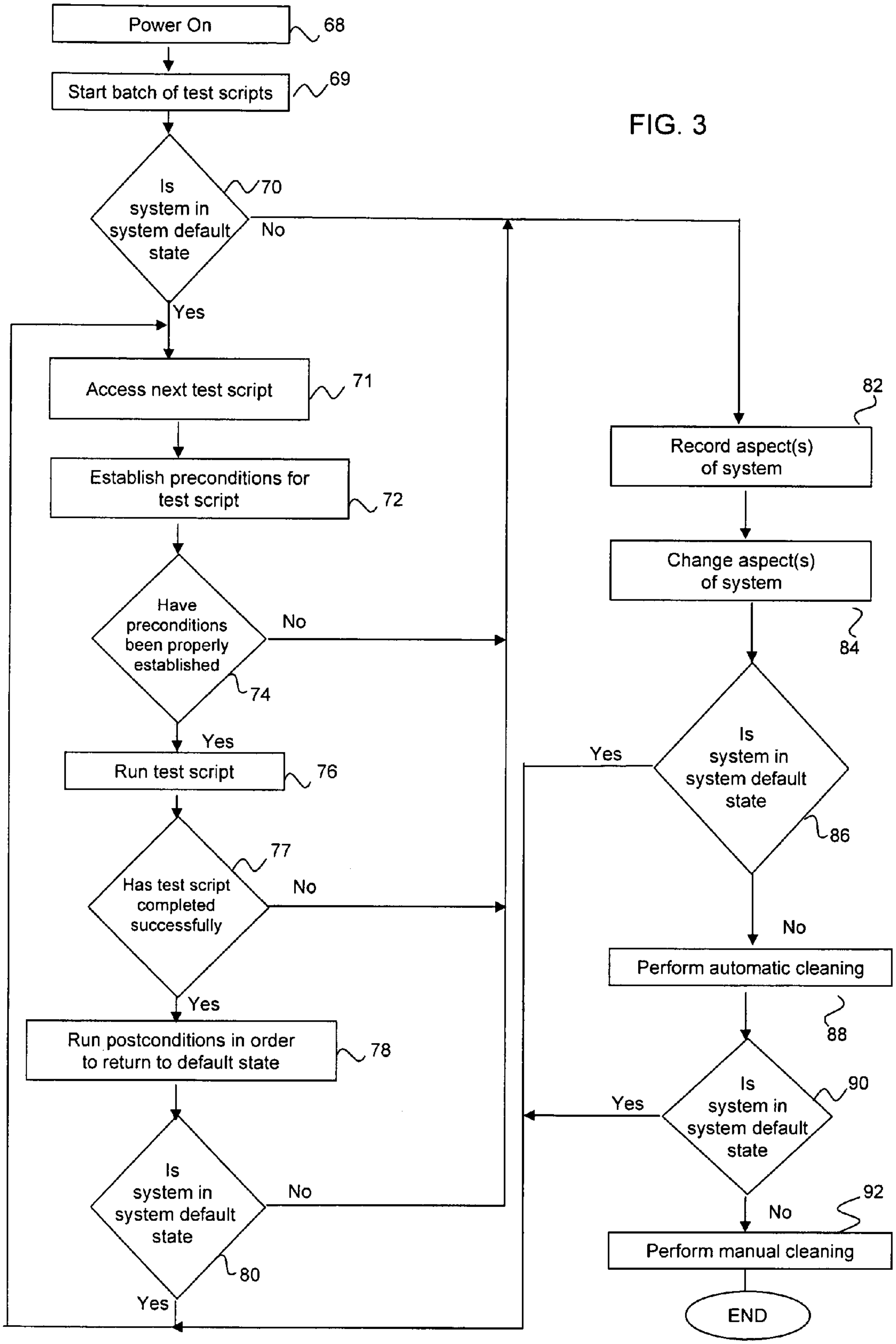
FIG. 3 is a flow chart of operation of one embodiment the aspect based recovery system and method.
Figure 4:
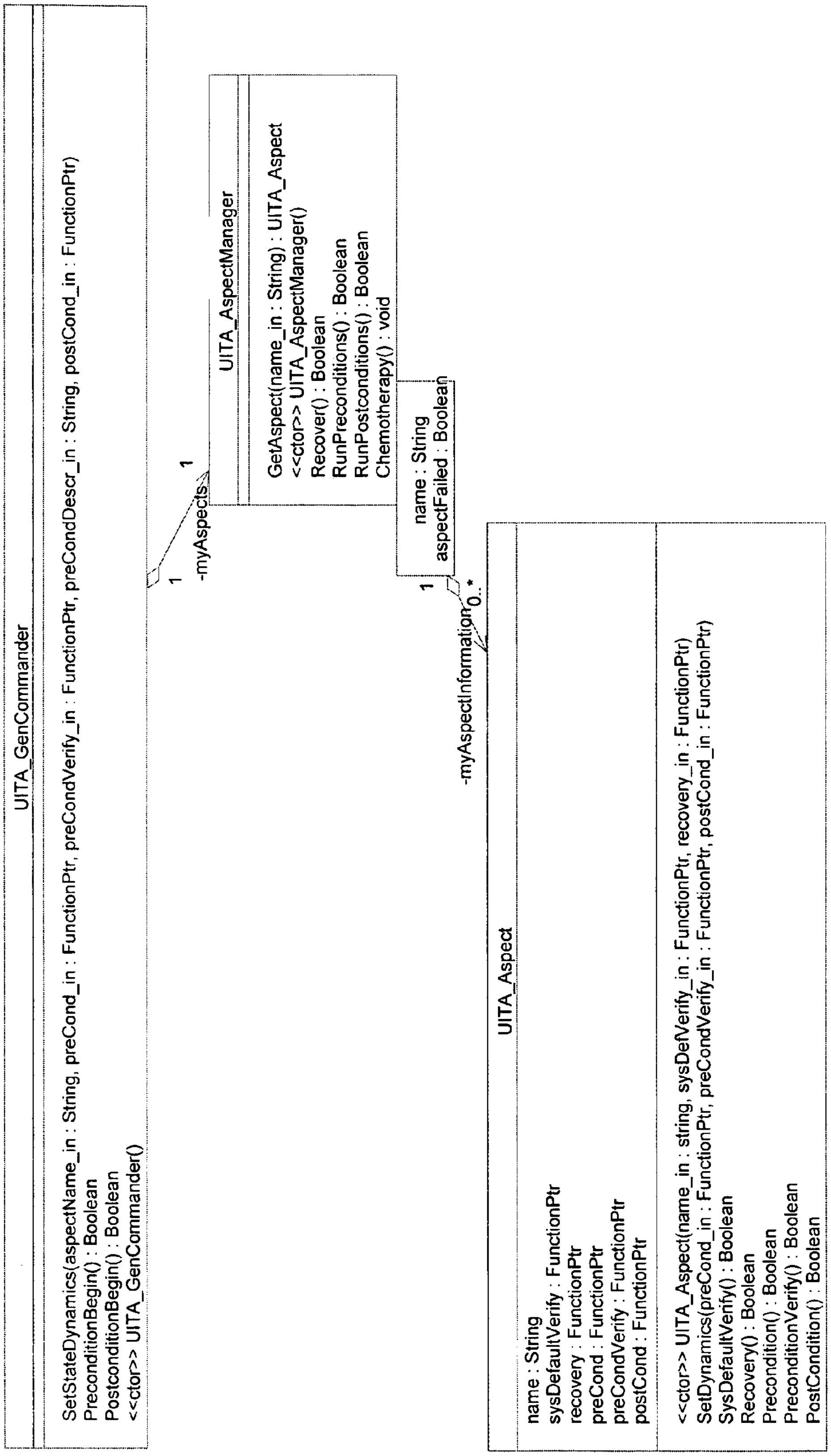
FIG. 4 is a class diagram for objects coded using object oriented programming in an aspect based recovery system and method described in FIG. 3.
Figure 5:
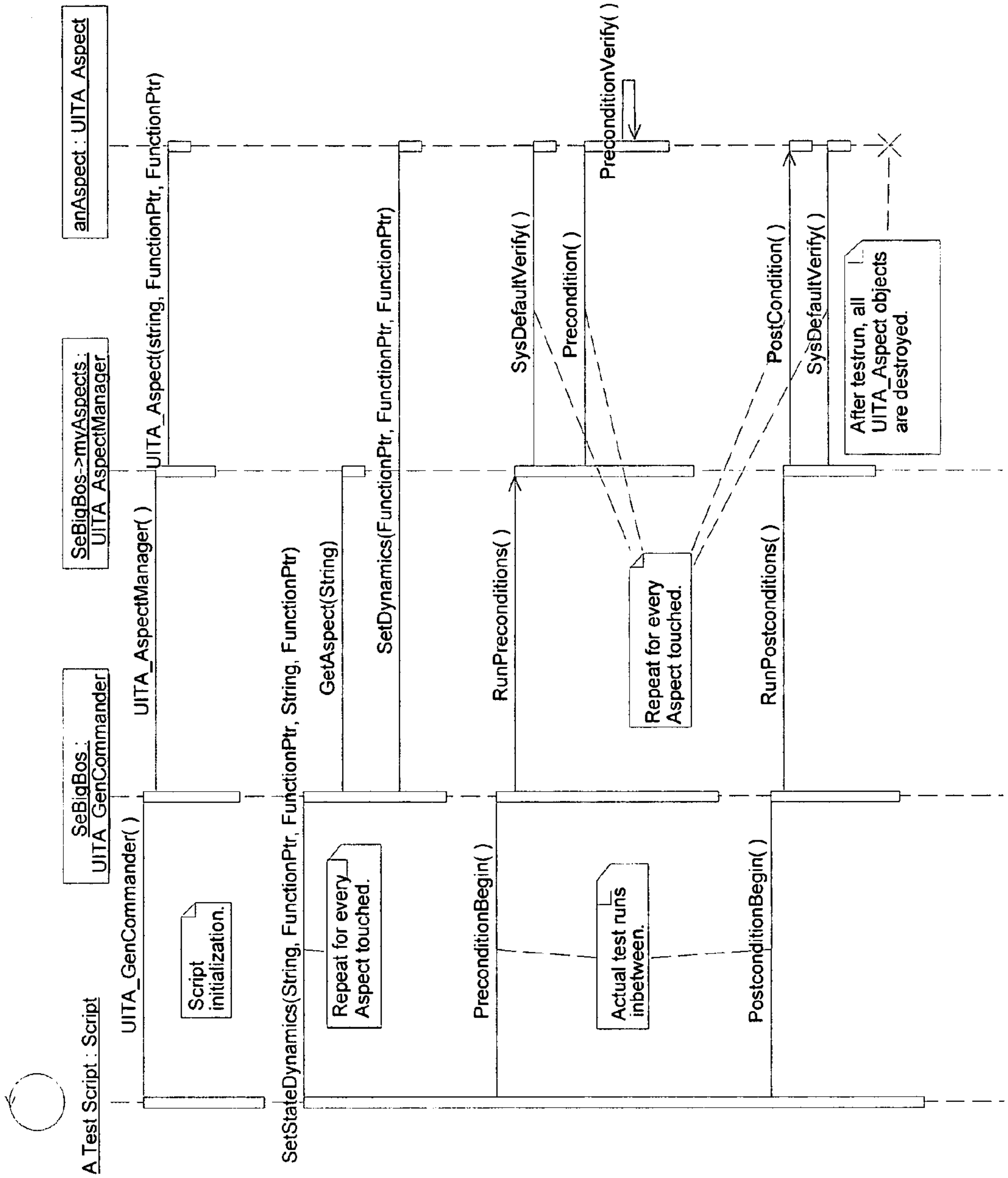
FIG. 5 is a flow diagram for the object oriented coding in FIG. 4 with no abnormal behavior detected while executing a test.
Figure 6:
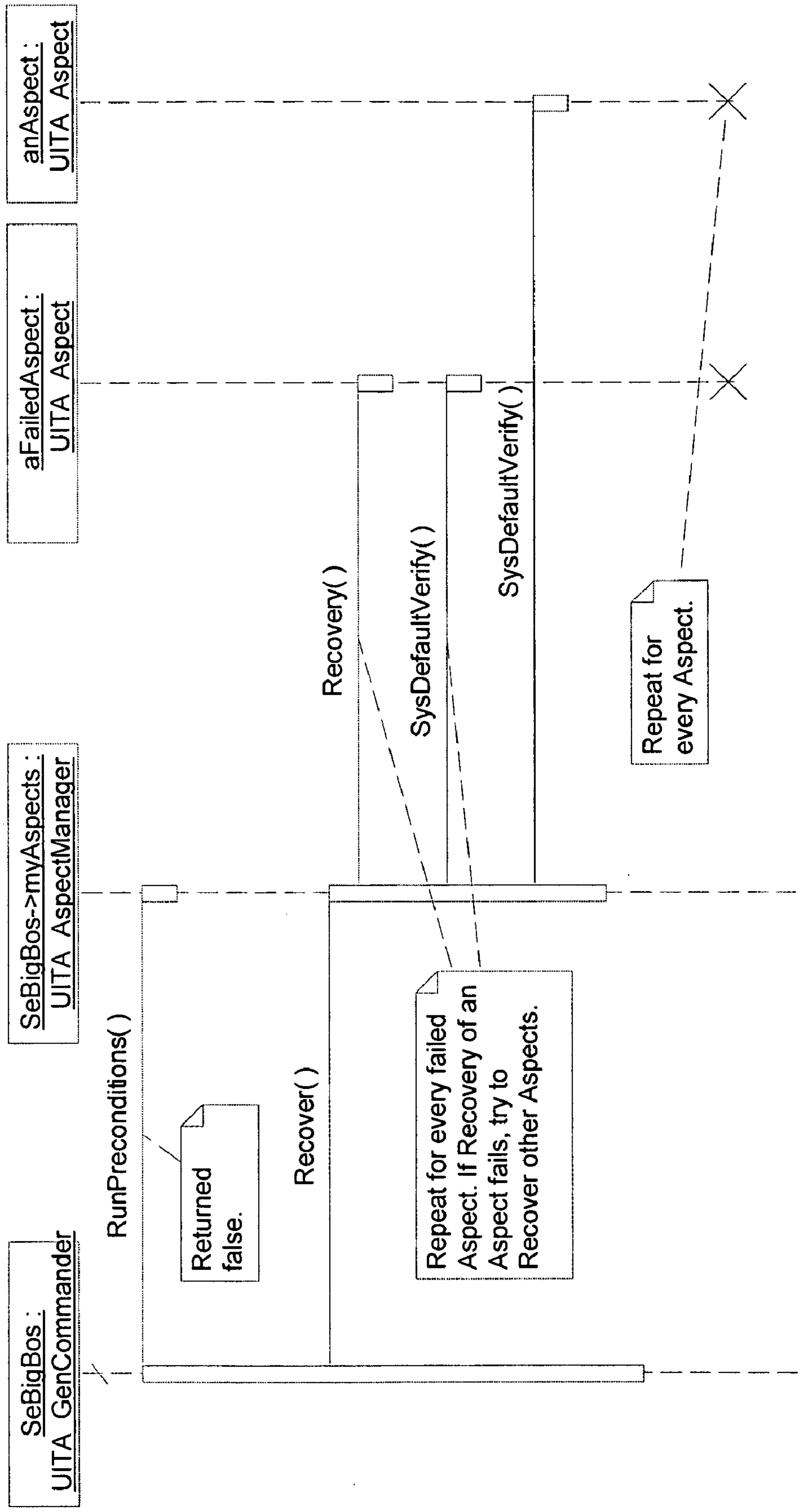
FIG. 6 is a flow diagram for the object oriented coding in FIG. 4 with abnormal behavior and recovery during precondition.
Figure 7:
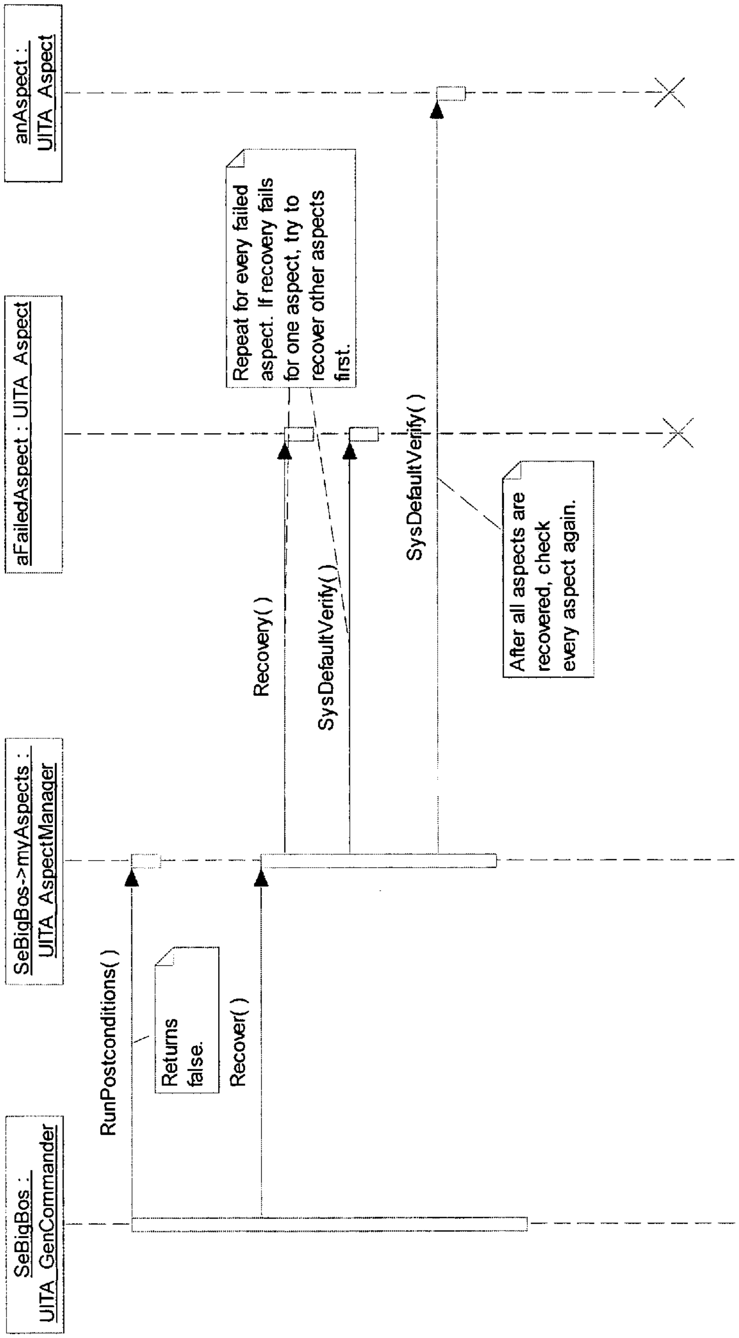
FIG. 7 is a flow diagram for the object oriented coding in FIG. 4 with abnormal behavior and recovery during postcondition.

Referring to FIG. 3, there is shown a flow chart of operation of one embodiment of the aspect based recovery system and method. Referring to FIG. 4, there is shown a class diagram for objects coded using object oriented programming in an aspect based recovery system and method. FIGS. 5-7 show flow diagrams for the object oriented coding in FIG. 4, with FIG. 5 showing a flow diagram with no abnormal behavior detected while executing a test, FIG. 6 showing a flow diagram with abnormal behavior and recovery during precondition, and FIG. 7 showing a flow diagram with abnormal behavior and recovery during postcondition.

As shown at block 68, the application under test is powered on. After power-up, the batch of testing sequences is started, as shown at block 69. The batch of testing sequences may be manually started by the operator in order to test the application under test. In preparation for running a testing sequence, the values for aspects during the testing sequence are initialized. This is shown in FIG. 5, which shows the script initialization for Universal Interface Test Automation (UITA) for the objects shown in FIG. 4. For example, as shown in FIGS. 4 and 5, SetStateDynamics includes values for the aspect name (aspectName_in), the aspect precondition for the test (preCond_in), the basis to verify that the precondition has been met for a certain aspect (preCondVerify_in), the description of the precondition (preCondDescr_in) and the postcondition for the aspect to return to system default (postCond_in). After executing the batch, the application under test enters the system default state, as shown in FIG. 2. After initialization of the system, the system may be checked to determine if it is in the default state, as shown at block 70.

Table 2 describes example aspects in a medical imaging application (e.g., magnetic resonance, ultrasound, computed tomography, x-ray or other therapeutic or diagnostic imaging), with example values for the system default and the example aspect recovery.

TABLE 2

Example Aspects

| Aspect | Example Aspect System Default | Example Aspect Recovery |
| --- | --- | --- |
| GUI | No message boxes or windows open in either of the taskcards.<br>No patients loaded in either of the taskcards.<br>Viewer taskcard up front. | Close all message boxes and dialog windows.<br>Unload all patients from all taskcards.<br>Close any additional message boxes.<br>Activate Viewer taskcard |
| Database | Local Database empty.<br>Exchangeboard (e.g., clipboard) empty. | Remove all jobs from the exchangeboard.<br>Clear the database |
| Security | Only users from Testhospital configured.<br>Only Testhopsital user groups configured.<br>Only Testhospital privileges configured.<br>Default user logged in. | Reset user table.<br>Reset user group table.<br>Reset privilege table.<br>Logout current user, login default user. |

As shown in Table 2, one aspect is Graphical User Interface (GUI). In the system default state, the GUI should include no message boxes or windows open in either of the taskcards, no patients loaded in either of the taskcards, and the viewer taskcard is in the front of the display. As discussed subsequently, the current aspects of the system are compared with the aspects of the default system. If the aspects differ, the current aspects may be changed to the default aspects. As shown in Table 2, example changes of the aspects are shown.

The analysis to determine whether the system is in the default state may depend on: (1) the choice of aspects to be examined; (2) the type of examination of the aspects chosen; and/or (3) the sequence of examination of the aspects. One, some, or all of the aspects may be chosen for examined to determine whether the system is in the default state. In one embodiment, all of the aspects are checked. In an alternate embodiment, only more important aspects for the operation of the system are examined.

Further, the type of the examination of an aspect to verify whether the system is in the default state may take several forms including: (1) analysis of an aspect independently of or dependent on other aspects in the system; (2) analysis of an aspect for particular data; (3) analysis of an aspect for general parameters; (4) analysis to determine whether a particular event has occurred. Typically, the aspects may be analyzed independently of one another to determine whether they are in the default state. Independent examination of aspects may be performed by using batches, such as from installation routines, COM servers, product component test APIs, etc. For example, if an aspect relates to a database entry, examination of the database may be performed independent of other aspects by using an application program interface (API) which allows direct examination of the database. Appendix B lists a tool, which may be written in VBScript or Jscript, for determining the state of the database aspect. Alternatively, the aspects may be examined in a manner which depends on other aspects in the system, as discussed in more detail below. The examination of an aspect to verify whether the aspect is in system default may comprise: analyzing the aspect for particular data (such as determining if the specific patient data was entered into RAM); analyzing the aspect for general parameters (such as determining if the loaded data corresponds to alphanumeric characters); or analyzing the aspect for occurrence of a particular event (such as if a message box is open). In Table 2, for example, the GUI, database and security aspects may be analyzed. For the database aspect, the database may be examined to determine whether the database and the exchangeboard are empty.

If the system is not verified to be in system default, as shown at block 70, the recovery procedure is entered, as shown at block 82. The system is not in system default if the aspects of the current state do not match the aspects of the default state. This determination may be performed by comparing the aspects of the current state with the aspects of the default state. The recovery procedure is discussed in more detail below. Alternatively, if the system is verified to be in system default, as shown at block 70, the next test script is accessed, as shown at block 71. The preconditions are then established for the test script, as shown at block 72. For example, the preconditions are established for at least some of the aspects of the system, as shown in FIG. 5, which runs the preconditions to establish the conditions for the test.

After which, it is determined whether the preconditions were established properly, as shown at block 74. This step may be a precondition verify step, providing verification that the preconditions were successfully established. This is shown in FIG. 5 as the PreconditionVerify step. Ordinarily, verification of the precondition step is not performed. Thus, prior to executing the test script, one cannot determine if the conditions precedent to the test have been established correctly. Specifically, if the system fails either during or after the test, one cannot automatically determine under previous testing automation systems whether the failure was due to the precondition step or due to the test script step.

As discussed above, the testing system may determine the state of the system at any point during the testing process. This may be performed, for example, after establishing preconditions to determine if the testing system is in script begin state (block 62 in FIG. 2) indicating that the preconditions have been established successfully or that the system is in a system unknown state (block 64 in FIG. 2) indicating that the preconditions have not been established successfully.

The analysis to verify whether the precondition(s) has been met may depend on: (1) the choice of aspects to be examined; (2) the type of examination of the aspects chosen; and/or (3) the sequence of examination of the aspects.

One, some or all of the aspects may be chosen for examination to determine the state of the system. In this manner, the automated testing may determine whether one, some or all aspects have failed to be in the expected state (the script begin state). For example, only aspects which relate to the preconditions may be examined. Specifically, the PreconditionVerify function may examine each aspect of the system which is affected by the precondition step. As one example, the precondition step may require the loading of patient data from a database into RAM. The PreconditionVerify function may examine the database aspect of the system which has been affected by the precondition step. As another example, the precondition step may require the loading of patient data in the user interface with certain security protections. In this instance, potentially three aspects may be affected by this operation. The first is the database aspect, which requires the loading of the patient data. To accomplish this, a command line interface may be used to put the patient data in the database. The second is the user interface aspect, which includes using a viewing, such as a patient browser, to view the data. The third is the security aspect, which would apply a protection to the patient data. To accomplish this, a command line interface may be used to apply a protection to the data. Alternatively, aspects designated as important may be analyzed as well. For example, one or some of the aspects, which may be deemed of greater importance to the functionality of the system, may be examined for all precondition verifications.

Further, the type of examination of an aspect to verify whether the precondition has been met may take several forms. One form is to analyze the aspect either independently of or dependently on other aspects in the system. As discussed above, analysis of an aspect may be independent of other aspects. To analyze the User Interface aspect independently, for example, an API in Windows® may query whether a window is open. As another example of independent examination, database content may be accessed by using an API. Typically, if there is embedded software directed to a certain aspect, examination of that aspect may be performed independently of other aspects. Alternatively, the database or other aspect may be analyzed in a manner dependent on another aspect, such as the user interface. For example, during the precondition verify step, the patient browser (which is part of the user-interface) may be opened to determine the contents of the database. The precondition verify step may analyze, via the patient browser, the contents of the database. Another example discussed above related to a precondition step loading patient data in the user interface with certain security protections. The precondition verify step may independently examine, at a system level, (1) whether the database includes the patient data; (2) whether the patient browser; and (3) whether security protections were attached to the patient data. Alternatively, the precondition verify step may examine in a dependent manner whether the preconditions have been met. One method of dependent examination is by logging in as the user who has access to the patient data, opening the patient browser and determining whether the patient data is accessible to the user. If the patient data is accessible to the user, the precondition step has been met. Another method of dependent examination is by logging in as a second user who does not have access to the patient data, opening the patient browser and determining whether the patient data is accessible to the second user. If the patient data is accessible to the second user, the precondition step has not been met. This type of dependent analysis of an aspect may be desirable if the purpose of the precondition verify step is not only to determine the contents of the database, but also to determine if the contents are accessible in the specific application (such as viewing the contents via the user interface). When analyzing an aspect in a dependent manner and a precondition is not met for a specific aspect, one may not be able to determine whether the cause was due to the specific aspect under analysis or whether the cause was due to examination in a manner which depends on another aspect. In one of the examples discussed above, if the testing automation software attempts to access the database using the patient browser and determines that the data in the database is not precondition state data, the cause of this may be: (1) that the data in the database is incorrect (i.e., the specific aspect under examination is the cause of the error); or (2) that the user-interface has malfunctioned so that attempts to access the database through the patient browser fails (i.e., another aspect which is not the focus of this examination is the cause of the error).

Another form is to analyze the aspect for particular data. For example, the database aspect described above may be compared to determine if the specific patient data was entered into RAM. Another form is to analyze the aspect for general parameters. For example, the database aspect described above may be analyzed to determine if the loaded data corresponds to alphanumeric characters. Still another form is to determine whether a particular event has occurred. For example, the graphical user interface (GUI) aspect may be analyzed to determine if a message box is open. Another example of an event is whether a certain user was logged into the system. Still another example of an event is whether certain data was protected. In many systems, data may be protected so that only certain login users may access the data. This precondition may be determined by logging in a user that should not have access to the data and determine whether the user may access the data. If the user cannot access the data, the precondition may be verified. Alternatively, if the user can access the data, the precondition is not verified.

Based on analyzing the aspect(s) of the system, one may determine whether the precondition has been properly established. If the precondition has been properly established, the test script is run, as shown at block 76. After the test script is run, a determination is made as to whether the test script has executed successfully, as shown at block 77. This determination may comprise determining whether the system is in the script end state (block 66 in FIG. 2). For example, the current aspects of the system may be compared with the expected aspects of the script end state. The analysis discussed above to determine whether the precondition has or has not been properly established may be similarly applied to determine the script end state has or has not been properly established. For example, if the current aspects match the expected aspects, the state of the computer is in the script end state. If not, the application under test may have crashed and the aspect based recovery may be implemented. If the precondition has not been properly established, the system is in an unknown state. Recovery to a known state, such as the default state, may then be performed.

Prior to changing the state, one, some, or all of the aspects may be recorded for subsequent analysis, as shown at block 82. For example, only the aspects which have failed to be in the expected state may be recorded. The precondition verify routine may indicate which aspects have failed. Alternatively, all of the aspects of the system may be recorded in order to provide a complete picture of the state of the system at the time of failure. Along with this information, the expected value and/or event for the aspect may be recorded as well. This may be used to compare with the actual value of the aspect in order to diagnose the cause of the failure better. Moreover, additional information may be recorded including the time of the failure, the current testing sequence (such as the current test script) the previous test script executed, etc. Additional information may also be logged in, such as processor load, RAM usage, etc. In an alternate embodiment, rather than recording information only after a failure to be in the expected state, information (such as aspects, time, processor load, RAM usage, etc.) may be recorded periodically even in the absence of a failure. For example, the information may be recorded after every testing sequence or during certain parts of the testing sequence.

After recording the information for failure analysis, one, some, or all of the aspects may be modified to place the system in a known state, such as the default state, as shown at block 84. As discussed above, the state of the testing system may be modified to any state based on changing aspects which define the state. At least one, some, or all of the aspects are changed to change from an unknown state to the default state. In one embodiment, all aspects may be examined to determine whether they are in the default state. If the aspect is not in the default state, the aspect is changed to its default state value.

In an alternate embodiment, fewer than all of the aspects may be changed to their default state. For example, recovery may be limited to a single aspect such as: a routine to kill all of the popup windows; a batch file that purges the user table and fills it with default data, such as Syngo® Test Hospital data, as described below; a routine that purges the local database and fills it with default data or keeps the database purged; or a routine to reestablish default system configuration. Each recovery may be implemented so it is generic for a given aspect, regardless of the testing sequence. Alternatively, aspect based recovery may execute a series of generic routines, with each of the generic routines recovering an aspect, one sequentially after the other. As another example, only the aspects which register an error (such as the precondition not being met) are changed to the default state. The precondition routines determine which aspects have not met their preconditions. These aspects may then be modified to their default state. For example, as shown in FIGS. 6 and 7, abnormal behavior might be discovered in either SysDefaultVerify( ) or PreconditionVerify( ). This may be reported to GenCommander through the RunPreconditions( ) and Run Postconditions( ) return values. Additionally, AspectManager might backreference SeBigBos for detailed error logging. Though not disclosed in the figures, this functionality may be supported by introducing an Initialize(SeBigBos: GenCommander) function. Alternatively, in addition to the aspects which register an error, other aspects may be examined to determine whether to modify the aspects to the default state values. For example, certain aspects, designated as important aspects, may be examined every time a precondition error has occurred. Examples of important aspects may include user interface or database aspects. The examination of these aspects may include determining whether the aspect is in the default state. This may comprise comparing the aspect value with the default state value. If the aspect is already in the default state, the aspect need not be changed to the default state. If the aspect is not in the default state, the aspect may be changed so that it is in the default state. Alternatively, rather than determining whether an important aspect is in the default state, the testing system may change all important aspects without this determination to ensure that they are in the default state. As another example, the aspects may be prioritized, with each aspect being assigned a high, medium and low priority. If an aspect fails upon establishing a precondition and the aspect is in the high priority category, only high priority aspects are examined to determine whether they are in the default state. Alternatively, if a failed aspect is in the medium priority category, high and medium priority aspects are examined. Finally, if a failed aspect is in the low priority category, high, medium and low priority aspects are examined. As one example of this, a cache aspect may be considered a low priority. If the cache typically includes a consistent set of data throughout operation of the system (e.g., a set of users for logging into a system), the contents of the cache may not need to be updated back to system default. Alternatively, if the cache aspect is considered more important, and the default system value for the cache is not in the default state, the contents of the cache may be overwritten.

Further, the sequence of examination and/or changing of aspects may be predetermined or may vary. In one embodiment, the sequence of examination and recovery of the aspects is predetermined. Specifically, each aspect is examined in a predetermined sequence. If an aspect is unable to be examined and/or recovered, the aspect is examined and/or recovered at a later point. This is due to the fact that an error in one aspect may affect examination or recovery of another aspect. When an aspect cannot be examined or recovered to its default state, the examination or recovery of the aspect may be performed at least a second time after other aspect(s) are recovered. For example, all aspects that are not examinable or recoverable may be examined or recovered in a second iteration. Those aspects that cannot be recovered in the second iteration may be examined in a third iteration. This process may be continued until the aspects that are not recoverable remain constant from one iteration to the next. In this instance, a more aggressive recovery is required, such as a reboot or a reinstallation. In addition, recording of the iterative process steps may be performed. As one example, a record may be compiled of the attempts made to determine or recover certain aspects for one, some, or all of the iterations. Further, the Aspect Manager, as disclosed in FIGS. 4-7, may monitor the attempts to determine and record which aspect hindered the correction of other aspects. This may be accomplished by examining the sequence of the correction of the aspects. For example, if aspect A is unable to be corrected in a first iteration, aspect B is the only aspect corrected in the first iteration, and aspect A is able to be corrected in the second iteration, the Aspect Manager may report that the correction of aspect A was dependent on aspect B. Moreover, the Aspect Manager may record certain portions of the aspect for later diagnosis. The recording may be directed to error messages provided by the system.

One example of this dependence which may require an iterative aspect based recovery may be with respect to database objects. Attempting to examine or modify a database object may fail if another aspect, such as a user interface aspect, has failed. In this instance, the database object is locked due to the failure of the other aspect. If an attempt is first made to the database object to change its value and the attempt fails, other aspects are modified, such as the user interface aspect. In this manner, the database object may be modified subsequently, after the user interface aspect is changed to the default state.

Finally, there may be different types of recovery to a known state. In one embodiment, there is only one type of recovery of the aspects to a known state. A generic routine for each aspect modifies each aspect to the system default state. Alternatively, there is more than one type of change back to system default. As discussed in more detail below with respect to FIGS. 8*a-e*, the type of recovery may be either micro or coarse. These different types of recovery enable the choice of how a particular aspect is changed to the system default state.

After the aspect(s) are changed, the state of the testing system is examined to determine if it is in the system default state, as shown at block 86. This is similar to the testing of the default state as described above with respect to block 70. If the system is in the system default state, the testing system proceeds to access the next test script, as shown at block 71. Otherwise, additional automatic cleansing may be performed, as shown at block 88.

One type of automatic cleansing may be termed cleansing chemotherapy, suggesting that this type of recovery is similar to the therapy technique to fight cancer. In cancer chemotherapy, after a successful treatment campaign in which body scans show no further sign of tumors, the patient is subjected to a final chemotherapy in order to destroy any malignant cells that escaped detection. In a similar way, the cleansing chemotherapy step may be performed in order to correct any sleeper cells of misaligned or erroneous unconsidered aspects that could be leftover in the system and potentially cause false test results at unpredictable points in time. The cleansing chemotherapy may be applied as a generic step after every time the aspect based recovery method, which recovers the system back to the default state, is called. Alternatively, the cleansing chemotherapy may be applied only after the aspect based recovery method has failed to return the system back to the default state, as shown in FIG. 3. One example of the cleansing chemotherapy may be an automatic reboot of the system in order to be able to run the default system startup checks and the aspect condition check an additional time. In addition to rebooting of the system, batch scripts which are executed once for postinstallation setup may be automatically executed once more. This may be done during power on as described in FIG. 2.

Another type of cleansing is an intermediate cleansing. This type of cleansing is not as exhaustive as the cleansing chemotherapy described above. Instead, for an application under test and test automation technique, it may be useful to automatically conduct additional cleanup steps. As shown in FIG. 3, the automatic cleansing is performed if the aspect based recovery fails to return the system to a known state, such as system default. Alternatively, the automatic cleansing, such as intermediate cleansing, may be automatically performed after aspect based recovery whether or not the aspect based recovery was successful. Further, the automatic cleansing may be performed before or after the aspect based recovery. One example of intermediate cleansing may include killing or removing all popup windows. Another example of intermediate cleansing may include the automatic ability to terminate a service spawned of the application under test. The application under test may spawn a separate service, such as a virus scan. The intermediate cleansing may terminate the virus scan. This intermediate cleansing step is optional and may exist independently of other recovery routines. For example, the intermediate cleansing may be part of the individual aspect recoveries of the aspect based recovery method.

After performing the automatic cleaning, the state of the testing system is examined to determine if it is in the system default state, as shown at block 90. This is similar to the testing of the default state as described above with respect to block 70. If the system is in the system default state, the testing system proceeds to access the next test script, as shown at block 71. Otherwise, additional manual cleansing may be performed, as shown at block 92. The manual cleansing may include reinstallation of the software for the system. For complex software products, however, the reinstallation may prove extremely time-consuming. Reinstallation may comprise manually setting up the operating system, manually installing the application software and manually configuring site specific configurations. For complex software products, however, the reinstallation may prove extremely time-consuming.

As discussed above, if the preconditions have been properly established, the test script is run, as shown at block 76. Then, the postconditions may be run. Postconditions, as discussed above, may be viewed as a "cleanup" stage for cleaning up the system prior to executing the next test. In one embodiment, the postconditions return the system to the default state, as shown at block 78. Alternatively, postconditions may bring the aspects back to a state different from system default. For example, postconditions may alter the state of the system to a test default state, which is the default state for a group of test cases. The test default state may be different from the system default state. Returning the system to a test default state, rather than system default state is acceptable if the testing sequences begin from the test default state. However, if different testing sequences begin from different states, additional cleanup may be required. This is discussed in more detail below. In still an alternate embodiment, postconditions need not be implemented. Rather, the aspect based recovery mechanism may be executed immediately after running the test script and bring the system back to system default.

After postconditions are run, the system may be checked to determine if it is in the system default state, as shown at block 80. If yes, the next test script is accessed, as shown at block 71, and the process is repeated. If the system is not in system default, the aspect based recovery may be executed, as discussed above.

One example of application of the aspect based recovery may be automated testing of a medical imaging application, such as Syngo®. Syngo® is a comprehensive software solution for medical imaging tasks, applications and systems. Syngo® enables all workplaces, from acquisition modality to independent workstations, to share the same intuitive user interface and operating principles. Syngo® provides this uniform working environment throughout clinical networks and beyond. Syngo® is designed to integrate medical imaging seamlessly into the complete clinical workflow from registration to billing.

To accomplish this integration of medical imaging, syngo has archiving and networking functionality including: (1) communicating patient and examination data; (2) exporting/importing image data to/from MOD, CD-R or floppy; (3) sending/receiving image data to/from other DICOM (Digital Imaging and Communications in Medicine) nodes in the network; and (4) searching and retrieving image data in the network.

Syngo® enables the exchange of information between systems from different vendors through networks or media. This leads to improved efficiency in diagnosis and therapy. Syngo® integrates medical imaging into a complete clinical workflow from referral to billing and thereby enables an optimized utilization of imaging systems. Syngo® supports a comprehensive set of DICOM objects including: Computed Radiography (CR); Computed Tomography (CT); Digital X-Ray (DX); Mammography (MG); Magnetic Resonance (MR); Nuclear Medicine (NM); Positron Emission Tomography (PET); Radiation Therapy (RT); Secondary Capture (SC); Ultrasound (US); US multi-frame; Waveforms; X-ray Angiography (XA); XA multi-frame; and X-ray Radiofluoroscopy (XRF). Further, Syngo® provides a comprehensive set of DICOM functions, compliant with IHE and VA regulations including: DICOM Worklist to register incoming patients directly from the scheduling system (e.g., the Radiology Information System); DICOM Modality Performed Procedure Step to enable complete procedure tracking for billing and utilization management; DICOM Print to expose images on a wide range of networked cameras and paper printers; DICOM Storage of information on connected nodes; DICOM Storage on a wide range of exchange media (e.g., Magneto-optical disc MOD, CD-R, Floppy); and DICOM Query & Retrieve for searching and retrieving patient data and examination data in the network. DICOM Storage Commitment.

Typically, the workflow progresses from registering a patient, acquiring an image for the patient, viewing the image, post processing of the image, and filming. Syngo® may accomplish these tasks for all segments of medical imaging including, for example: patient registration; patient browsing; viewing; filming; 3D; fly-through; and image fusion.

Patient registration may include: all relevant patient demographic and examination data; direct entry or retrieval from a DICOM worklist provider; direct launch of the acquisition with a single mouse-click; procedure tracking with DICOM MPPS (Modality Performed Procedure Step); and correction of wrong or missing entries in patient demographics and DICOM attributes.

The patient browser may include consistent access from all applications on the system to patient and examination data. Viewing may include the functionality of: loading images from the Patient Browser or directly from other Syngo® applications (e.g., examination or 3D post processing); displaying and arranging the images in the way best suited to the diagnostic problem; reviewing, processing and evaluating the results and prepare them for diagnostics; and sending the images to filming, storing them or sending them to other locations in the hospital.

Filming may include the functionality of previewing on a 1:1 basis of a virtual film sheet; directly manipulating images interactively; exposing (manually or automatically) on film or paper; controlling film job status (repeat, cancel, re-direct). 3D (Process volume data sets from various modalities; Merge overlapping 3D-series into a single consistent 3D series; Confine the data sets with clipbox or irregular volume-of-interest; Display the data as high-quality; Multiplanar reconstruction (MPR); Shaded surface display (SSD); Maximum intensity projection (MIP)); Volume Rendering Technique and Object Editor). CorRea relates to additional data associated with an image which provides an identification of the image for billing, storing, and analysis purposes. The additional data may include the patient identification, patient date of birth and sex of patient. In this manner, a specific image may be reference using the additional data, such as the patient identification. CorRea is a data editing tool, allowing for modification of the additional data associated with the image.

As discussed above, Syngo® integrates medical imaging into a complete clinical workflow from referral to billing. MPPS (modality performed procedure step) allows for integration of these separate hospital applications, from billing, patient records, purchasing, etc. For example, if a patient is analyzed using a CT scanner, the specific image of the patient and the X-ray dosage resulting from the scan may be sent to the patient records application. Further, the information regarding the scan may be sent to the billing application. Finally, materials used from the CT scan may be reported to the purchasing application.

Example aspects for testing automation of the Syngo® application are shown in FIGS. 8*a-e*. As shown in the figures, the aspects are grouped by state group, which categories common aspects. For example, the database state group comprises aspects default data, testcase specific data, and exchangeboard. Further, a description is provided for each aspect, the system default for each aspect, and possible states after a testing procedure is executed. Aspect based recovery may implement different types of recovery to the default state. For example, as shown in FIGS. 8*a-e*, different types of recovery may be micro cleanup and coarse cleanup. The micro cleanup is less invasive than the coarse cleanup. Implementation of aspect based recovery may be solely using micro cleanup, solely using coarse cleanup, or a combination of micro and coarse cleanup. For micro cleanup, the aspect based recovery may modify aspects such as by reloading or removing data, closing windows, etc. For coarse cleanup, the aspect based recovery may purge and reestablish default configuration or may restart a component of the system. The forced restart of the component is contrasted with a reboot, which is a forced restart of the entire application under test. As discussed above, one benefit of the aspect based recovery is the individual correction of aspects. Designing an application under test with components enables better testing and control of aspects which are assigned to the components.

As shown in FIGS. 8*a-e*, some of the state groups are specific to the Syngo® application including: patient registration; patient browser; viewer; filming; 3D; CorRea; and MPPS. When subjecting an application, such as Syngo® to automated testing, aspects of Syngo® may be defined, as disclosed in FIGS. 8*a-e*. The automated testing may execute test scripts for each of the functionalities, in a variety of ways, of registering a patient, acquiring an image for the patient, viewing the image, post processing of the image, and filming.

FIG. 2 shows a flow diagram wherein the system default is the state of the system where the precondition for the test script is established. There are instances where the precondition for the test script is established from a state which is other than the system default state. For example, the precondition may be established from an elevated state in the system. The elevated state may be a state which the application under test defines as its default state, but which is not the default state for the system.

For example, in Syngo® filming, some testcases require an additional personal computer to be setup to simulate a DICOM printer node. As another example, a computer system may be connected to a specific database (such as a database containing patient data). If all testcases follow the guidelines discussed with respect to FIGS. 2 and 3 in starting from system default, this setup (requiring at least one restart of Syngo®) must be made and unmade for every testcase, incurring additional execution time that increases with every such testcase. Rather than starting from system default, automated testing may setup this network configuration once and then test all related cases in a row. Such default states that are not system default can be integrated into an aspect based recovery mechanism. Moreover, using the aspect based recovery mechanism in some modes of test execution enables additional advantages apart from recovery from a system unknown state, as discussed in more detail below.

Figure 9:
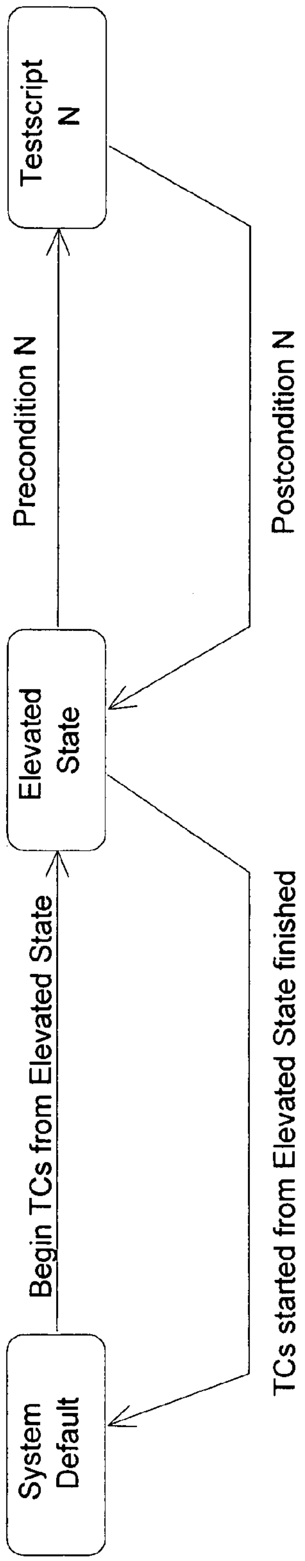
FIG. 9 is a flow diagram of a second embodiment of potential states, including an elevated state, when testing an application.

Referring to FIG. 9, there is shown a flow diagram of a second embodiment of potential states, including an elevated state, when testing an application. In the context of automated testing, various testing routines may test different features of the application under test. One set of testing routines may start from a first common starting point whereas a second set of testing routines may start from a second common starting point. The elevated state may thus represent a common starting point for a series of tests, differing from the system default state in at least one aspect. For example, there may be a state transition between system default and the elevated state akin to the state transition for Precondition of a test can be defined. As shown in FIG. 9, a routine may be executed for the system to transition from the system default state to the elevated state. From the elevated state, a precondition routine (precondition N) may be run to setup for the testscript (Testscript N). After the testscript has been run, a postcondition routine (postcondition N) may be run to return to the elevated state.

Figure 10:
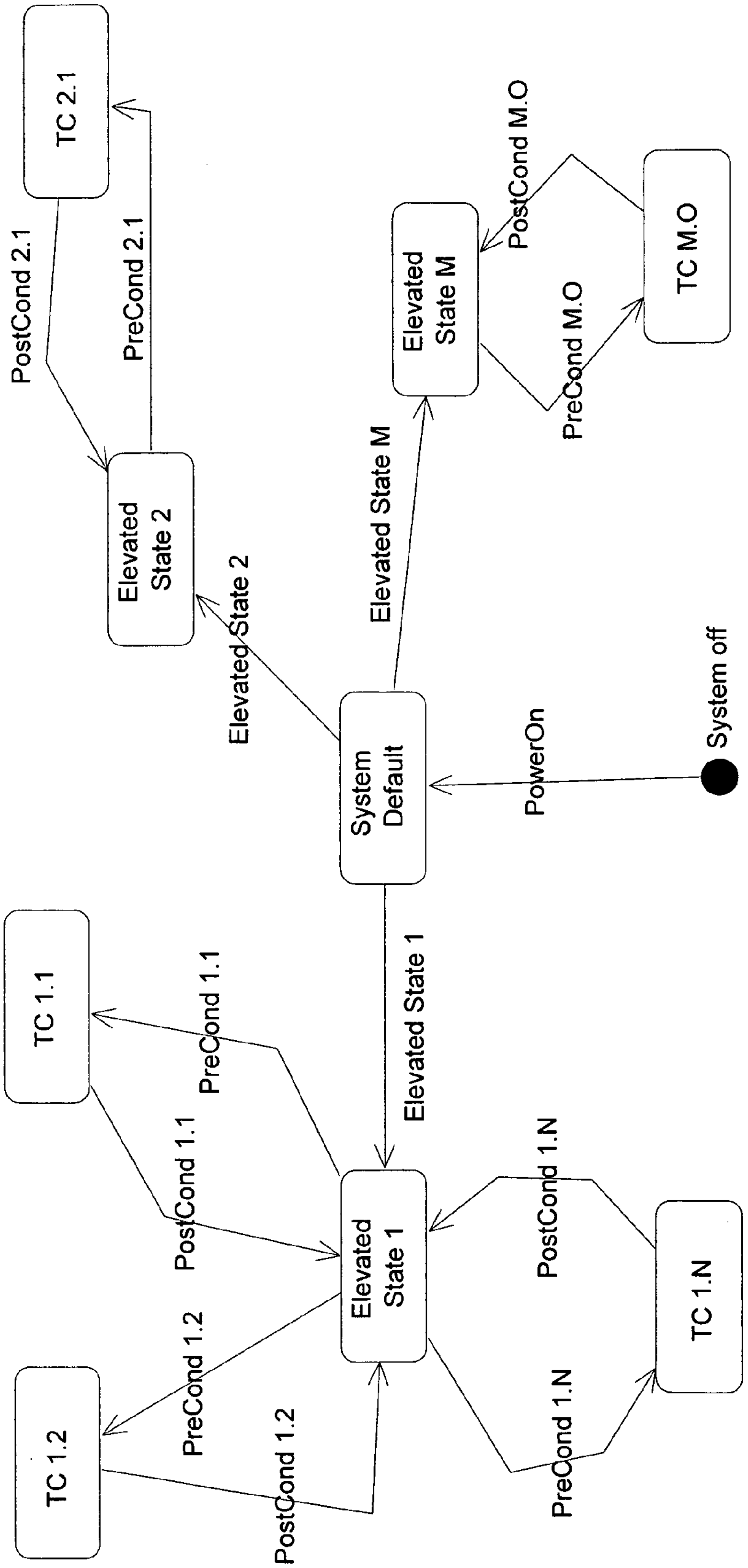
FIG. 10 is a flow diagram of a third embodiment of potential states, including multiple elevated states, when testing an application.

Referring to FIG. 10, there is shown a flow diagram with multiple elevated states when testing an application. After system power up, the system may be in the system default state. From the system default state, routines may be run to place the system in any one of a plurality of elevated states, from elevated state 1, elevated state 2, . . . to elevated state M. Tests may be run from the elevated states. For example, from elevated state 1, testcase (TC) 1.1 may be run. To run TC 1.1, a precondition routine (PreCond 1.1) may be run to place the system in the correct precondition to run TC 1.1. Thereafter, the TC 1.1 may be run. After which, a postcondition routine (PostCond 1.1) may be run to return the state of the system to elevated state 1. Further, as shown in FIG. 10, any number of testcases may be run from an elevated state. For example, a plurality of testcases may be run from elevated state 1, such as TC 1.1, TC 1.2 . . . TC 1.N. Moreover, a plurality of testcases may be run from other elevated states in the system, such as TC 2.1 executed from elevated state 2 or TC M.O executed from elevated state M.

As discussed above, the aspect based recovery mechanism enables the placement of the system into any state. This allows the system to be changed from an unknown state to a known state or from one known state to a second known state. In the context of testing a plurality of testcases with several elevated states, aspect based recovery may be used to execute the testcases in a more efficient and straightforward manner.

A test framework may execute the sequence of testcases in any sequence. One approach is to execute testscripts which belong to the same elevated state. For example, the test framework can reestablish an Elevated State X after successful execution of a testscript X.Y, if the next testscript is of type X.Z without passing through System Default. Execution may be organized in a way so that many testscripts belonging to an Elevated State X are scheduled for Execution in direct sequence. Another approach is to execute the testscripts in any sequence not considering the elevated states to which the testscripts belong. The sequence may be chosen at random or systematically. The aspect based recovery mechanism may be used to execute any set of testscripts regardless of sequence.

Using the example shown in FIG. 10, a testing sequence using TC 1.1 and TC 2.1 may be run. After running TC 1.1, the system is in elevated state 1. In order to execute TC 2.1, the system needs to be in elevated state 2. Rather than creating a special routine to transition from elevated state 1 to elevated state 2 or manually modifying the state of the system, aspect based recovery may be used to change the state of the system. Specifically, the state of the system may be changed by changing various aspects. The state of the system may be changed to an intermediate state, such as system default (after which a routine may be run to change the state of the system to elevated state 2), or may be changed directly to the next state (such as directly from elevated state 1 to elevated state 2). Thus, the sequence of testcases need not be limited to executing only testcases that begin from the same elevated state. Rather, any sequence or order of testcases may be run regardless of the elevated state from which the testcase is based. Moreover, in the event that the system enters an unknown state, the aspect based recovery mechanism may be used to place the system in any known state, such as the system default state as discussed above.

The system may transition through the system default state when tests are executed with different elevated states (such as TC 1.1 AND TC 2.1). In this manner, there is no need to implement routines for direct transitions between elevated states; such transitions may be made via the system default state. This reduces the number of transitions to program from (2n)! to 2n, where n is the number of elevated states. Transition in this context refers to one or more aspect transitions per state transition. Moreover, the system default state may be used when the automated testing enters an unknown state. Specifically, recovery routines to elevated states need not be implemented; in case of unforeseeable application behavior the automation system returns to system default. Finally, aspect changes for the system default recovery routines may be harnessed to provide for backtransitions to the system default state from elevated states. If implemented throughout the system, the number of transitions to elevated states that must be implemented drops to n.

To transition between the system default state and an elevated state, the aspects which differ between the elevated state and the system default state may be identified. A function to change or modify these differing aspects may be used to change the state of the system, such as changing the differing aspects to default state aspects to transition to the default state or changing the differing aspects to elevated state aspects to transition to the elevated state. The transition routines may be generic routines which transition each of the aspects in the system back to the default state. Alternatively, to make this transition even more lightweight, a recovery routine could be empowered to query the aspects in an elevated state which differs from the system default state. The recovery routine may then only attempt to alter these differing aspects back to system default state when asked to transition from an elevated state to the system default state.

Figure 11:
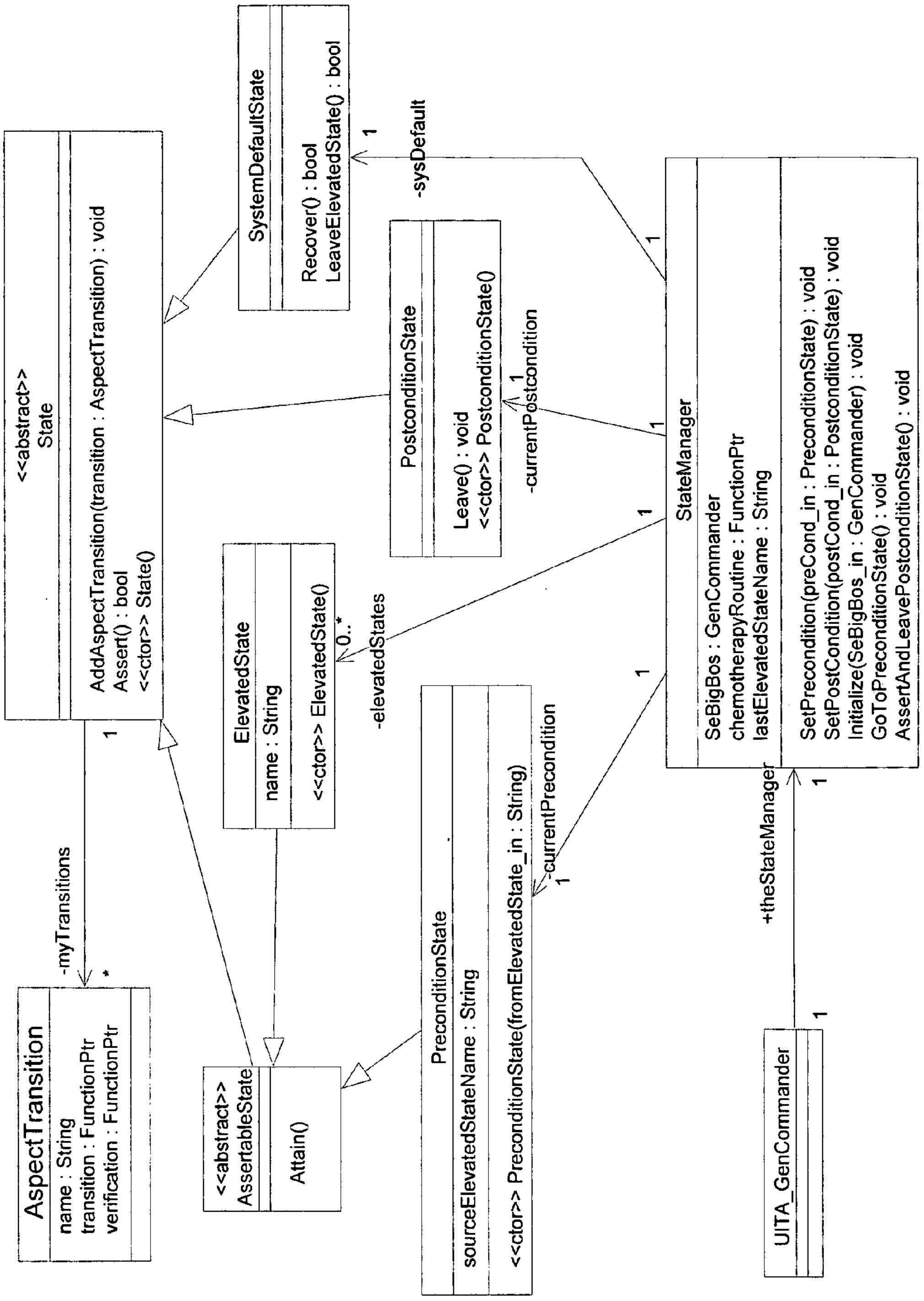
FIG. 11 is another example of a class diagram for objects coded using object oriented programming in an aspect based recovery system and method.

FIG. 11 shows one possible class structure for an aspect based recovery mechanism implementation in an object oriented language that allows use of elevated states. The class structure shown in FIG. 11 differs from the example shown in FIG. 4. For example, the class structure shown in FIG. 11 makes use of inheritance. As shown in FIG. 11, the AspectTransition class owns both a pointer to a transition and a verification routine. The PreconditionState and ElevatedState classes may be used to execute first the former, then the latter, while the PostconditionState and SystemDefaultState classes may use these routines in different order, as discussed above.

Figure 12:
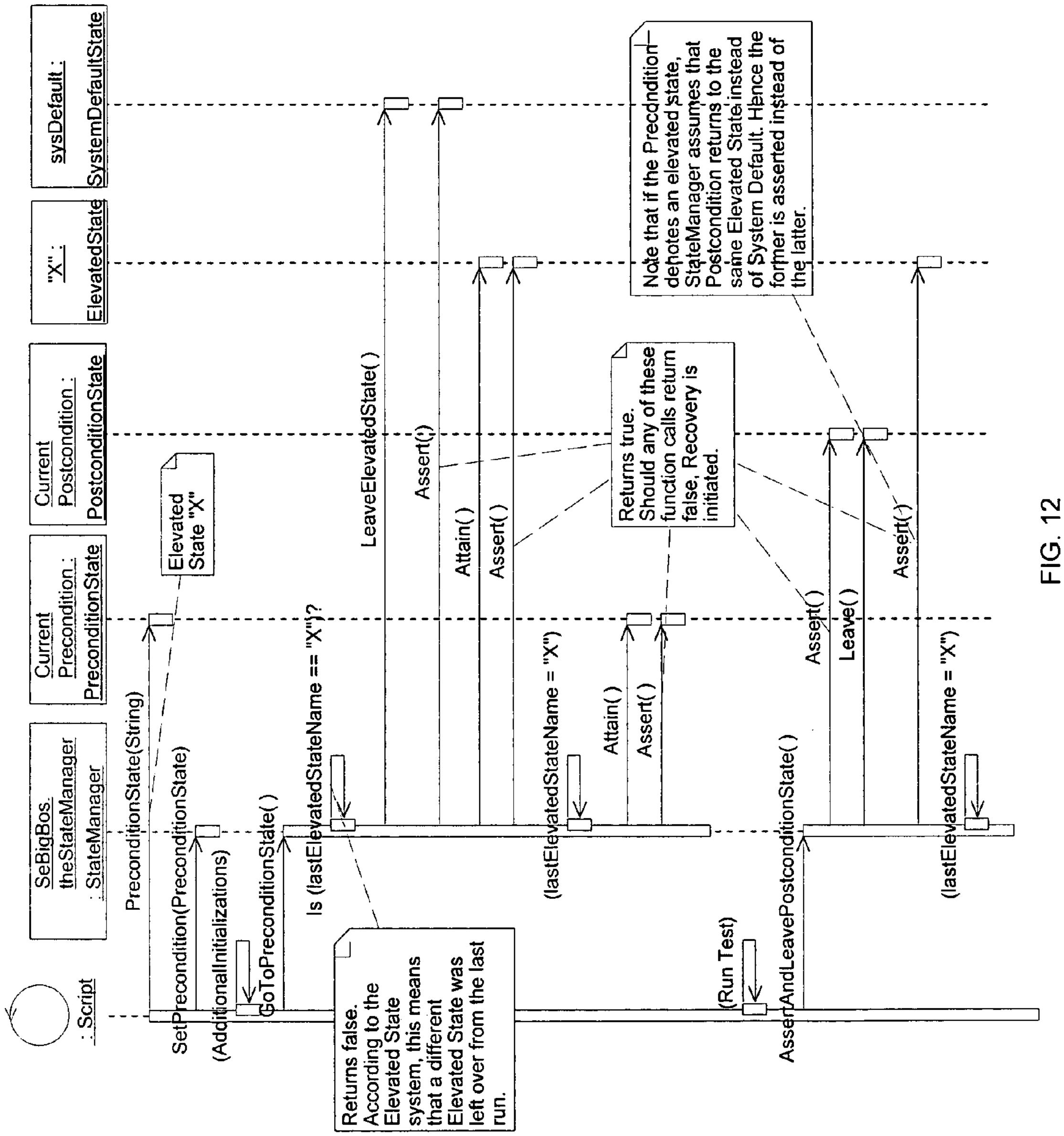
FIG. 12 is a flow diagram for the object oriented coding in FIG. 11 with no abnormal behavior detected while executing a test.
Figure 13:
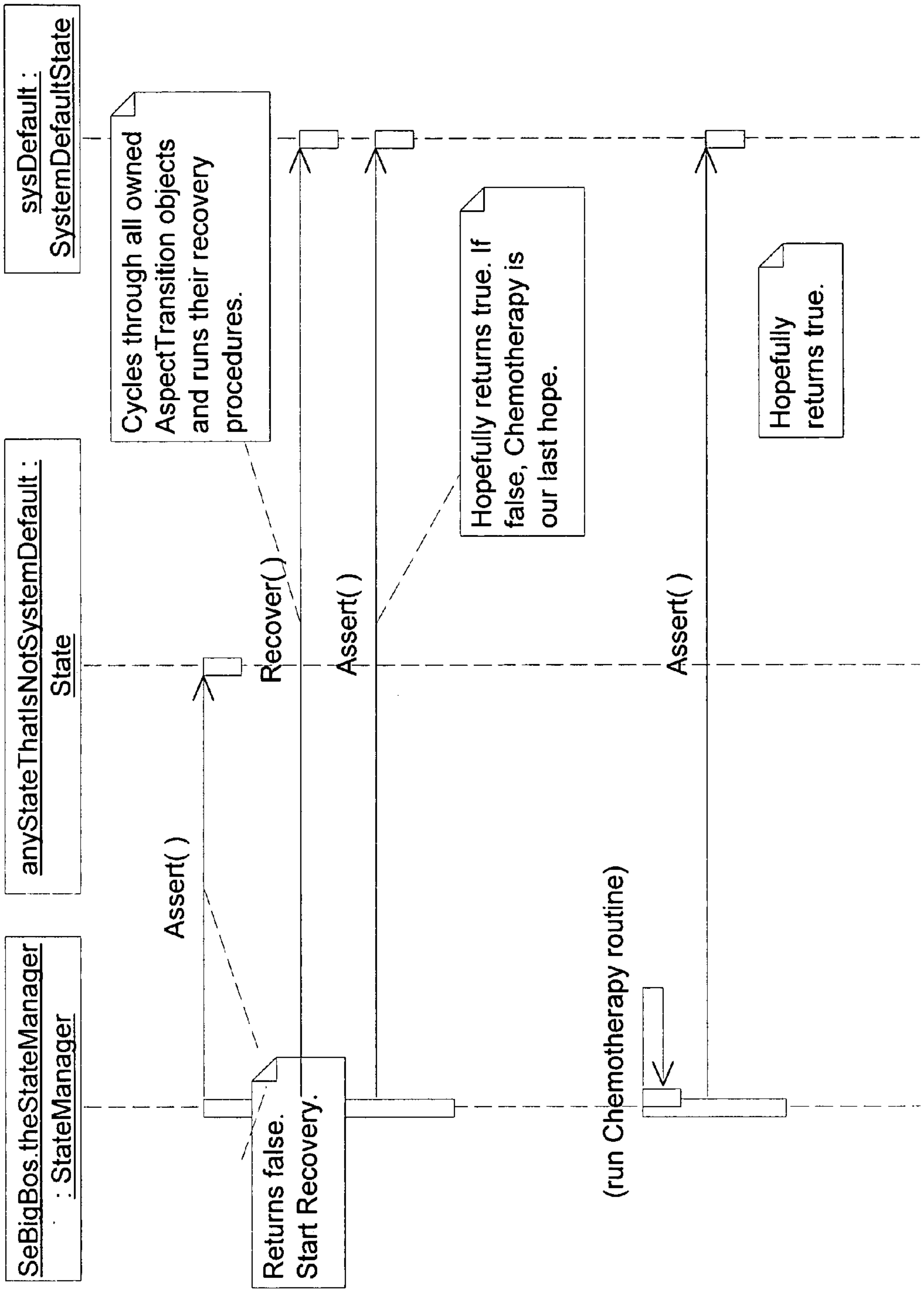
FIG. 13 is a flow diagram for the object oriented coding in FIG. 11 with abnormal behavior and recovery.

FIGS. 12 and 13 are flow diagrams which show how the class structure from FIG. 11 could work. FIG. 12 is a flow diagram for the object oriented coding in FIG. 11 with no abnormal behavior detected while executing a test. Prior to execution of the automation testing, initialization of the aspect based recovery mechanism may be performed. After initialization, the testing may begin. As shown in FIG. 12, the aspect based recovery mechanism checks the elevated state for the next test. If the elevated state for the next test is the same as the elevated state for the previous test, no aspect based recovery is necessary. If the elevated state for the next test is different from the elevated state for the previous test, aspect based recovery may be used. For example, if TC 1.1 was first executed, the elevated state is elevated state 1. If TC 2.1 is to be executed after, the elevated state is elevated state 2, meaning that prior to execution of TC 2.1, a state transition is made from elevated state 1. As shown in FIG. 12, it appears that the elevated state for the current test is different from the previous test. Specifically, the query Is (last ElevatedStateName==X) returns false, meaning that a different elevated state was used in the previous test.

As discussed above, one way to transition from one elevated state to another is via the system default state. As shown in FIG. 12, the transition to the system default state is using the function LeaveElevatedState( ). After which, the Assert( ) function is used to verify that the system is in the system default state. As discussed above, one manner in which to verify that the state is in a predetermined state, such as the system default state, is by comparing the aspects of the current state with known aspects. If the aspects of the current state match with a known state, such as the system default state, the system is presumed to be in the system default state. As shown in FIG. 12, the system has been verified to be in the system default state.

For automated testing, one method is to transition to a state and then verify one, some or all of the aspects of the elevated state afterwards. Thus, the paradigm is to premeditate a state, calling the function Attain( ) to attain it, and then verify the assumption using Assert( ). Following this methodology, the system is transitioned to elevated state "X" using the Attain( ) command. The Attain( ) command may comprise determining which aspects of the system in the elevated state "X" differ from the system default state and changing those aspects. After which, the current state of the system is checked using the Assert( ) command to determine that the system is in the elevated state "X". As shown in FIG. 12, the system has been verified to be in the elevated state "X".

Further, the variable lastElevatedStateName is set to X to signify that the testing routine currently executed had a default state of "X". This allows for storage of the elevated state of the current test executed, which may be compared to the elevated state of the subsequent test executed. Precondition for the testing sequence is executed using the Attain( ) command. For example, PreCond 1.1 may be executed. After which, the current state of the system is checked using the Assert( ) command to determine that the system is in the state to execute TC 1.1. After the test (such as TC 1.1) is run, the postcondition is asserted to verify in the postcondition state. After which, a postcondition routine may be implemented using the Leave( ) command to return to the elevated state "X". For example, PostCond 1.1 from FIG. 10 may be used to return to elevated state 1. Finally, the current state of the system is checked using the Assert( ) command to determine that the system is in the elevated state "X". Thus, FIG. 12 shows one example of a normal execution of a testing protocol which may use the aspect based recovery mechanism.

FIG. 13 is a flow diagram for the object oriented design in FIG. 11 with abnormal behavior and recovery. FIG. 13 shows an Assert( ) command which attempts to verify the state of the system. The Assert( ) command may be used at any point in the testing process, such as when entering an elevated state, a precondition state, a post testscript state, a postcondition state, etc. As shown in FIG. 13, the Assert( ) command returns a false indication, meaning that the state of the system is not in an expected state. For example, if the system is expected to be in elevated state 1 and the aspects do not match that of elevated state 1, the Assert( ) command returns a false value. In this instance, the Recover( ) function of the aspect based recovery mechanism may be used to recover the system using to a known state, such as the system default state. The recovery mechanism may be that as disclosed above, attempting to change the aspects of the system back to system default. This changing of the aspects may be performed iteratively, as discussed above. After the Recover( ) function is executed, the Assert( ) command is used to verify whether the system has returned to the system default state. If true, the automated testing may continue with the aspects of the system being changed to the elevated state of the next test script being executed. If false, more aggressive recovery may be necessary. Several types of more aggressive recovery are disclosed above. One type of more aggressive recovery is the Chemotherapy routine. After the chemotherapy routine is run, the Assert( ) command is used to verify whether the system has returned to the system default state.

While this invention has been shown and described in connection with the preferred embodiments, it is apparent that certain changes and modifications in addition to those mentioned above may be made from the basic features of this invention. Aspect based recovery may be applied to a variety of products, such as software based, hardware based, or software/hardware based products. Moreover, aspect based recovery may be used to determine the state of the product at any point of its operation life, from automated testing of the product to operation of the product in the field. Further, aspect based recovery may modify the state of the product, such as from an unknown state to a known state (e.g., default state).

In addition, there are many different types of computer software and hardware that may be utilized in practicing the invention, and the invention is not limited to the examples described above. The invention was described with reference to acts and symbolic representations of operations that are performed by one or more electronic devices. As such, it will be understood that such acts and operations, include the manipulation by the processing unit of the electronic device of electrical signals representing data in a structured form. This manipulation transforms the data or maintains it at locations in the memory system of the electronic device, which reconfigures or otherwise alters the operation of the electronic device in a manner well understood by those skilled in the art. The data structures where data is maintained are physical locations of the memory that have particular properties defined by the format of the data. While the invention is described in the foregoing context, it is not meant to be limiting, as those of skill in the art will appreciate that the acts and operations described may also be implemented in hardware. Accordingly, it is the intention of the Applicants to protect all variations and modification within the valid scope of the present invention. It is intended that the invention be defined by the following claims, including all equivalents.

APPENDIX A

Usage: seci login <username> <pwd> <domain> seci logoff <userId> seci getCurrentUser seci authorize <userId> <application> <token> seci dbAuthorize <userId> <oids> . . .

seci checkAccess <userId> <application> <token> <requiredAccessMask> seci audit <applName> <funcpointId> [<parameter> . . . ]

seci secCmd . . .

seci auditCmd . . .

seci dbCmd . . .

seci reconfigure seci exitServer seci protectionList seci getList <tokenName> seci readAllTokens <userId> seci userconfig <path> <key> seci getDefaultProt <userId> seci getEffDefaultProt <userOrGroupSpec> seci setDefaultProt (install|uninstall|read|save) <userOrGroupSpec> <protectionList> seci setObjProtections (<loid>|<securityId>) <protectionList> seci getObjProtections (<loid>|<securityId>) . . .

seci config Value install <categoryName> <paraName> <value>[<Comment> <type><options> <listVal1> . . . ]

seci config Value (uninstall|read) <categoryName> <paraName> seci config Value write|append <categoryName> <paraName> <value> seci privilege (install|uninstall|read) <applName> <funcToken> [<comment>]

seci auditConfig (install|uninstall|read) <applName> <funcPointID> [<comment>]

seci setPermissions <applName> <funcToken> (clear|<userOrGroupSpec> (<allowString>|-) <denyString>)

seci getPermissions <applName> <funcToken> <userOrGroupSpec> seci setAllApplTokenPerms <userOrGroupSpec> (<allowString>|-)<denyString>)

seci directPermission (<userName> <domain> <allowString>|<directPermString>)

seci copyToken <origAppl> <origToken> [<newAppl> <newToken>]

seci certificate (help|<options>)

seci setFileSecurity <filename> <userSid> (N|N|W|F)

seci getLocalizedAccount Everyone

Used environment variables: SECICMD_TESTLOOPNUM=<numberOfExecutions>
SECICMD_TESTLOOPSLEEP=<sleepTimeInMillisecs>

APPENDIX B

How to use the txtExplorer

==========================

1: Operation modes

==================

The txtExplorer can be used in three different modes:

a- Commandline mode

All Commands that are given in the CommandLine will be executed in their Order. Every command must be preceded by a "-". Example:

txtexplorer -d mydatabase -listpatients will invoke the Tool, open the database "mydatabase" and list all Patients in that Database.

b- Interactive mode

With the Commandline Argument "-i", the Tool switches to the Interactive mode. Here, all commands are entered in a shell-like environment. No "-" must be entered before any command. Example:

txtexplorer -d mydatbase -i will invoke the Tool, open the database "mydatabase" and switch into interactive mode.

>> listpatients will list all patients.

c- File mode

In the file mode all commands are read from a file. The Syntax is the same as in interactive mode. Example:

txtexplorer -file myfile will invoke the Tool, switch to File mode and executer all commands in the file "myfile"

This is common for all modes:

Commands and Arguments must be separated by one or more Spaces.

Commands are not case-sensitive

Commands may be abbreviated, but one should be aware of ambiguities.

If an Argument contains Spaces, it must be Quoted (Example: "Argument with Spaces").

List Expansion: If a command requires a Loid as an argument, one can also enter the List Index of the previously executed Listxx command.

A "#" denotes a comment till the end of the Line.

Attribute Lists: Attributes in ( ) are not accessible by the generic Interface, so they are not modifyable.

2: Example

==========

Invoke the Tool, open Database <dbname> and go into interactive mode: txtExplorer -d<dbname> -i List all available commands:
help List all Patients in the Database:
listpatients Select the First patient in the List and dump the whole Tree:
list 1

Switch mode: Dump only Attributes with a value:
nulls off

Dump all Patients and its Trees:
listpatients
forall %pat {list %pat}

Show all CsaStoreDB Locations
liststoredb

Create a new CsaStoreDB Location at c:\TEMP
createstoredb mystoredb c:\TEMP

Load an Image into the Database
load c:\myimages\ct01.img

Unload an Image by Loid and save it in d:\newimage.img
unload 123.0.99223 d:\newimage.img Get All Studies for a Patient
liststudies 123.0.99220

Get All Series for Study No. 1 in the previous displayed List created with liststudies
listseries 1

Get All Images for Series No. 1 in the previously displayed List created with Liststudies
listimages 1

3: Extending

============

1—Create own DLL by deriving from class pxExplorerServer.

2—Create 'Factory' function createInstance.

3—Tell Explorer which DLL to load by
a: commandline :txtExplorerd @myDLL -d . . .
b: Env Var: SET DLL_PXEXPLORER=mydll.dll or SET DLL_PXEXPLORERD=mydebugdll.dll ? :Help—List all commands help :Help—List all commands session :Set Session mode to pessimistic (=default) or Optimistic. Must be used before opening the first database open :same as -d d :Open Database dbname medcom :Open all Databases defined in MedCom COnfiguration setdefaultDB :Set Database <arg0> as Default Database setdefaultLo :Set Lock <arg0> as Default Lock. Possible are NOLOCK, RLOCK, WLOCK (RLOCK is default).

getdefaultDB :Get current Default Database listDB :List all open Databases close :Close Database <arg0> commit :Commit Changes (this is the default when leaving the Tool)

zapcods :Commit Changes and clean up COD-Table.

rollback :Rollback changes list :list all Instances that are in the Closure of Loid <arg0> data :List Instances and data (on=default) or list only Instances (off)
data on (default) :List Classes and Attributes
data off :List only Classes recurse :Access recursively the whole closure (on=default) or not (off)

listPatients :list all CsaPatient Instances listStudies :list all CsaStudy Instances for the given PatientLoid <arg0> listSeries :list all CsaSeries Instances for the given CsaStudyLoid <arg0> listImages :list all CsaImage Instances for the given CsaSeriesLoid <arg0> check :Perform a Dicom-Sematics-check on Instance <arg0> (and closure)

delete :Delete Instance with Loid <arg0> and its Sub-Tree in the DB forcedelete :(Forced) Delete Instance with Loid <arg0> and its Sub-Tree in the DB createInstan :Create a Instance of class <arg0> in the DB saveAsNew :duplicate Document <arg0> as a new one (modif Uids). Needs ExchangeBoard copyDocument :duplicate Document <arg0> into the ExchangeBoard move :move Document <arg0> to another database <arg1>. Links to old DB will remain ! Needs ExchangeBoard link :link Document <arg0> to Root Document <arg1>.

unlink :unlink Document <arg0> from its Root Document.

query :Run a Database query using the Versant Query Language, f.e. query "select selfoid from CsaPatient".

lock :Lock Object with loid <arg0> with Lock <arg1> (RLOCK, WLOCK, ULOCK, . . . )

nulls :List used and empty Attributes (on=default) or not (off)
nulls on (default) :List also empty Attributes.
nulls off :Do not List empty Attributes.

modify :Modify Instance with loid<arg0>; set Attribute <arg1>, Index <arg2> with Operation <arg3>
to value <arg4>. Operations are:

Set/Remove/Add/RemoveOne/InsertOne/ReplaceOne.

All Arguments 4 must be given, even if they don't make sense for the specified Operation.

file :Read commands from file <arg0> (same Syntax as in -i mode)

i :Switch to interactive mode (commands are the same, but omit leading '-' !)

logging :Print CsaStatus Items in Errormessage (on=default) or not (off)

exit :Exit interactive mode/File mode quit :Same as exit server :Server mode: Await commands in File <arg0>, delete file after execution. Write results in file <arg1> pad :Shorten data to fit on 120-chars-Line (on) or not (off=default)

load :Load an(more) Image given by <arg0> into the Database. Wildcards *ARE* Supported.

unload :Unload Image/Series/Study/Patient with Loid <arg0> into Dicom Message in file <arg1> listStoreDb :List all CsaStoreDB Instances in the DB createStoreD :Create a CsaStoreDB Instance with Name <arg0> and Path <arg1> in the DB autosave :Change autosave Flag (commit after each command)

autosave on (default) :Every command call commit after execution autosave off (default) :commit/rollback must be called by the user.

ForAll :Repeat following Block for all listed Loids;

Syntax :forall xx {cmds xx cmds }

Repeat :Repeat following Block( = <arg1>) exactly <arg0> times (-1 means forever);

Syntax :repeat num {cmds cmds } loadlibrary :Load a library , whose name is given in <arg0> (DLL)

CAUTION: Will only work BEFORE opening a Database Session !

initDbInfo :Initialize dbinfo Object in default Db and set with current values.

getDbInfo :Get DbInfo Object in default Database and list its contents checkconfig :Check Versant/Database configuration sleep :Sleep some seconds (arg1)

date :Print Date and Time echo :Print a string <arg0> pxsv :Send Cmd <arg0> and data <arg1> to PatexServer xmldump :Dump data into XML. Arg0=type: COMPOSITE, CLOSURE, ENTITY, QUERY, Arg1=Loid or Classname, Arg2=filename sort :Sort <arg0> according criteria <arg1>. Always force a resort.

getsorted :Get sorted list for object <arg0> according criteria <arg1> updatescs :Check and update SCS attribute for loid <arg0>.

The invention claimed is:

1. A system comprising:

a computer system to be tested;

logic for defining a state of the computer system by a plurality of aspects of the computer system;

logic for accessing a software routine for placing the computer system in an expected state defined by a plurality of expected aspects;

logic for executing the software routine on the computer system after which the computer system is in a current state defined by a plurality of current aspects; and logic for verifying whether the current state of the computer system is the expected state based on comparison of a plurality of current aspects with the plurality of expected aspects in a sequence that is determined prior to a first comparison of the current aspects and the expected aspects.

2. The system of claim 1, wherein the expected aspects of the state are independent of one another.

3. The system of claim 1, wherein the aspects are selected from the group consisting of graphical user interface, database, security, user configuration, site configuration, and current user.

4. The system of claim 1, wherein the software routine is an automated test routine selected from the group consisting of a precondition test routine, a testscript, and a postcondition test routine.

5. The system of claim 1, wherein the logic for verifying whether the current state of the computer system is the expected state comprises logic for determining whether the current aspects equal corresponding predetermined aspects.

6. The system of claim 1, further comprising logic for modifying at least one of the current aspects in order to change the state of the computer system to a recovery state defined by recovery aspects.

7. The system of claim 6, wherein the recovery state is a system default state; and wherein the logic for modifying comprises logic for modifying the current aspect to a system default aspect.

8. The system of claim 1, wherein the recovery routine is an interactive routine.

9. A system for modifying a state of a system comprising:

a computer system;

logic for defining the state of the computer system by a plurality of aspects of the computer system;

logic for executing a software routine on the computer system after which the computer system is in a current state defined by a plurality of current aspects;

logic for determining whether to execute a predetermined automatic recovery routine based on the current state of the system by comparison of the plurality of current aspects with a plurality of expected aspects in a sequence that is determined prior to a first comparison of the current aspects and the expected aspects; and wherein when the current state is not an expected state, further comprising:

logic for executing the predetermined automatic recovery routine, the automatic recovery routine modifying at least one aspect to place the computer system in a recovery state.

10. The system of claim 9, wherein the aspects of the computer system are independent of one another.

11. The system of claim 9, wherein the software routine is an automated test routine for placing the system in an expected state with expected aspects; and wherein the logic for determining whether to execute an automatic recovery routine comprises logic for comparing the current aspects with the expected aspects to determine whether the current state is the expected state.

12. The system of claim 11, further comprising logic for determining which of the current aspects differ from corresponding recovery aspects; and wherein the automatic recovery routine comprises modifying the current aspects which differ from the corresponding recovery aspects.

13. The system of claim 12, wherein the automatic recovery routine consists of automatically modifying the current aspects which differ from the corresponding recovery aspects.

14. The system of claim 9, wherein the automatic recovery routine modifies aspects of the computer system independently of one another.

15. The system of claim 9, wherein the software routine is a first automated test routine with a first elevated state; and wherein the logic for determining whether to execute an automatic recovery routine comprises logic for comparing the first elevated state with a second elevated state of a second automated test routine, the second automated test routine being executed subsequent to the first automated test routine.

16. The system of claim 9, wherein the automatic recovery routine comprises iteratively attempting to modify at least one aspect of the system.

17. The method of claim 16, wherein the automatic recovery routine iteratively attempts to recover aspects until a number of aspects that are unrecoverable from one iteration to a subsequent iteration remains constant.

18. The system of claim 9, wherein the logic for executing an automatic recovery routine comprises:

logic for attempting to modify a first aspect to a first recovery aspect;

logic for determining that the attempt to modify the first aspect failed;

logic for modifying other aspects to recovery aspects; and logic for attempting for at least a second time to modify the first aspect to the first recovery aspect.

19. The system of claim 9, further comprising logic for executing a second automated recovery routine which reboots the system.

20. A method for verifying a state of a system comprising:

providing a computer system;

defining the state of the computer system by a plurality of aspects of the computer system;

accessing a software routine for placing the computer system in an expected state defined by a plurality of expected aspects;

executing the software routine on the computer system after which the computer system is in a current state defined by a plurality of current aspects; and verifying whether the current state of the computer system is the expected state based on comparison of the plurality of current aspects with the plurality of expected aspects in a sequence that is determined prior to a first comparison of the current aspects and the expected aspects.

21. The method of claim 20, wherein verifying whether the current state of the computer system is the expected state comprises determining whether the current aspects equal corresponding predetermined aspects.

22. The method of claim 20, further comprising modifying at least one of the current aspects in order to change the state of the computer system to a recovery state defined by recovery aspects.

23. A method for modifying a state of a system comprising:

providing a computer system;

defining the state of the computer system by a plurality of aspects of the computer system;

executing a software routine on the computer system after which the computer system is in a current state defined by a plurality of current aspects;

determining whether to execute a predetermined automatic recovery routine based on verifying whether the current state of the computer system is an expected state based on comparison of the plurality of current aspects with a plurality of expected aspects in a sequence that is determined prior to a first comparison of the current aspects and the expected aspects; and executing the predetermined automatic recovery routine, the automatic recovery routine modifying at least one current aspect to place the computer system in a recovery state.

24. The method of claim 23, wherein the automatic recovery routine comprises iteratively attempting to modify at least one aspect of the system.

25. The method of claim 23, wherein the automatic recovery routine modifies aspects of the computer system independently of one another.

26. The method of claim 23, wherein the aspects of at least one state are orthogonal.

27. A method for executing a recovery routine for a system having a plurality of states, at least one of the states being defined by a plurality of aspects, the method comprising: providing a software routine for placing a computer system in an expected state defined by a plurality of expected aspects; executing the software routine on the computer system after which the computer system is in a current state defined by current aspects; determining whether the current aspects match the expected aspects by comparison of a plurality of current aspects with a plurality of expected aspects in a sequence that is determined prior to a first comparison of the current aspects and the expected aspects; determining whether the current state is the expected state based, at least in part, on determining whether the current aspects match the desired expected aspects; and executing a recovery routine if the current state is not the expected state, the recovery routine modifying the at least some of the current aspects.

28. The method of claim 27, wherein executing the recovery routine changes the state of the computer system to a system default state.

29. The method of claim 27, wherein an aspect of the plurality of aspects comprises a graphical user interface aspect, wherein modifying the current aspect comprises closing all popup windows.

30. A method for executing a recovery routine for a system, the system having a plurality of states at least one of the states defined by a plurality aspects, the method comprising: executing a software routine on a computer system; automatically determining, after executing the software routine, whether the computer system is in an unknown state by comparison of a plurality of current aspects with a plurality of expected aspects in a sequence that is determined prior to a first comparison of the current aspects and the expected aspects; and automatically changing from the unknown state to a known state of the computer system, the step of automatically changing consisting of modifying aspects of the computer system in one of a predetermined or an iterative manner to place the computer system in the known state.

31. The method of claim 30, wherein automatically determining, after executing the software routine, whether the computer system is in an unknown state comprises examining at least some of the aspects of the computer system.

32. A method for executing a recovery routine for a system, the system having a plurality of states, at least one of the states being defined by a plurality of aspects, the method comprising: providing a software routine for placing a computer system in an expected state defined by a plurality of expected aspects; executing the software routine on the computer system after which the computer system is in a current state defined by a plurality of current aspects; automatically analyzing the current aspects of the current state of the computer system with respect to the expected aspects of the expected state comparison of the plurality of current aspects with the plurality of expected aspects in a sequence that is determined prior to a first comparison of the current aspects and the expected aspects; automatically determining the current aspects which differ from the expected aspects and the current aspects which match the expected aspects; and, in at least one of a predetermined or an iterative manner, modifying the state of the computer system by modifying the current aspects which differ from the expected aspects and not modifying the current aspects which match the expected aspects.

33. The method of claim 32, wherein the automated testing routine tests medical imaging software.

34. A method for executing a recovery routine for a system, the system having a plurality of states at least one of the states defined by aspects, the method comprising: providing a software routine for placing a computer system in an expected state defined by a plurality of expected aspects; executing the software routine on the computer system after which the computer system is in a current state defined by a plurality current aspects; automatically analyzing the current aspects of the current state of the computer system with respect to the expected aspects of the expected state by comparison of the plurality of current aspects with the plurality of expected aspects in a sequence that is determined prior to a first comparison of the current aspects and the expected aspects; automatically determining the current aspects which differ from the expected aspects and the current aspects which match the expected aspects; and modifying at least some of the current aspects which differ from the expected aspects in a predetermined or an iterative manner.

35. The method of claim 34, further comprising a forced restart of the computer system, the forced restart being performed after modifying at least some of the current aspects.

36. The method of claim 34, wherein the software routine is a first automated test routine with a first elevated state; and wherein the logic for determining whether to modify at least some of the current aspects comprises logic for comparing the first elevated state with a second elevated state of a second automated test routine, the second automated test routine being executed subsequent to the first automated test routine.

37. A method for recording aspects for a system, the system having a plurality of states at least one of the states defined by a plurality of aspects, the method comprising: providing a software routine for placing a computer system in an expected state defined by a plurality of expected aspects; executing the software routine on the computer system after which the computer system is in a current state defined by a plurality current aspects; automatically analyzing the current aspects of the current state of the computer system with respect to the expected aspects of the expected state by comparison of the plurality of current aspects with the plurality of expected aspects in a sequence that is determined prior to a first comparison of the current aspects and the expected aspects; automatically determining the current aspects which differ from the expected aspects and the current aspects which match the expected aspects; and recording the current aspects which differ from the expected aspects.

38. The method of claim 37, further comprising: recording the current aspects which match the expected aspects.

39. An aspect based recovery system for application software on a computer system comprising; a computer system having stored thereon the application software; programming code on said computer system for executing at least a portion of the application software; programming code on said computer system for determining whether the computer system is in an unknown state by comparison of a plurality of current aspects with a plurality of expected aspects in a sequence that is determined prior to a first comparison of the current aspects and the expected aspects; and programming code on said computer system for changing from the unknown state to a known state of the computer system, the programming code for modifying aspects of the computer system independently of one another in a predetermined or an iterative manner to place the computer system in the known state, wherein at least one of the states is defined by a plurality of aspects.

* * * * *